United States Patent [19]
Bland et al.

[11] Patent Number: 5,427,842
[45] Date of Patent: Jun. 27, 1995

[54] TEAR RESISTANT MULTILAYER FILMS AND ARTICLES INCORPORATING SUCH FILMS

[75] Inventors: Ralph H. Bland, St. Paul, Minn.; James M. Jonza, Round Rock, Tex.; James D. Smith, St. Paul, Minn.; Richard C. Allen, Mendota Heights, Minn.; Jeffrey F. Bradley, Woodbury, Minn.; Kenneth B. Smith, Shoreview, Minn.; Bruce D. Stambaugh, Anaheim, Calif.

[73] Assignee: Minnesota Mining and Manufacturing Company, St. Paul, Minn.

[21] Appl. No.: 250,645

[22] Filed: May 27, 1994
(Under 37 CFR 1.47)

Related U.S. Application Data

[63] Continuation of Ser. No. 955,357, Oct. 1, 1992, abandoned.

[51] Int. Cl.$^6$ ............ B32B 27/08; B32B 7/12
[52] U.S. Cl. ............ 428/213; 428/215; 428/216; 428/354; 428/480; 428/483; 428/515; 428/910; 428/40
[58] Field of Search ........ 428/354, 40, 480, 483, 428/515, 213, 216, 215, 910

[56] References Cited

U.S. PATENT DOCUMENTS

| | | | |
|---|---|---|---|
| 3,188,265 | 6/1965 | Charbonneau | 161/188 |
| 3,485,912 | 12/1969 | Schrenk et al. | 264/171 |
| 3,487,505 | 1/1970 | Chisholm | 18/13 |
| 3,565,985 | 2/1971 | Schrenk et al. | 264/171 |
| 3,576,707 | 4/1971 | Schrenk et al. | 161/164 |
| 3,607,354 | 9/1971 | Krogh et al. | 117/41 |
| 3,647,612 | 3/1972 | Schrenk et al. | 161/165 |
| 3,711,176 | 1/1973 | Alfrey, Jr. et al. | 350/1 |
| 3,741,253 | 6/1973 | Brax et al. | 138/137 |
| 3,759,647 | 9/1973 | Schrenk et al. | 425/131 |
| 3,775,226 | 11/1973 | Windorf | 156/71 |

(List continued on next page.)

FOREIGN PATENT DOCUMENTS

| | | | |
|---|---|---|---|
| 0206053 | 12/1986 | European Pat. Off. | C09J 7/02 |
| 0258063 | 2/1988 | European Pat. Off. | B32B 17/10 |
| 0426636A2 | 5/1991 | European Pat. Off. | B32B 7/02 |
| 0437942A2 | 7/1991 | European Pat. Off. | C08J 5/18 |
| 2311762 | 12/1976 | France . | |
| 3716004 | 11/1988 | Germany . | |
| 63-53943 | 10/1988 | Japan | B32B 27/36 |
| 2-16050 | 1/1990 | Japan | B32B 27/36 |
| 2-270553 | 11/1990 | Japan | B32B 27/36 |
| 3-274151 | 12/1991 | Japan | B32B 7/08 |
| 1451331 | 4/1974 | United Kingdom | B24D 11/02 |
| 1431916 | 4/1976 | United Kingdom | C08L 67/02 |
| 86/02396 | 4/1986 | WIPO | B24D 11/02 |
| 9006849 | 6/1990 | WIPO . | |

OTHER PUBLICATIONS

Schrenk, W. J. and Alfrey, T., Jr., "Some Physical Properties of Multilayer Films", *Polymer Polymer Engineering and Science*, vol. 9, No. 6, Nov. 1969, pp. 393–399.

Im, J. and Schrenk, W. J., "Coextruded Microlayer Film and Sheet", *Journal of Plastic Film and Sheeting*, vol. 4, Apr. 1988, pp. 104–115.

Research Disclosure, "Coextruded Film and Sheeting Structures of Polypropylene and Polyester", Oct. 1989.

Baer, Eric, "Advanced Polymers", *Scientific American*, Oct. 1986.

*Primary Examiner*—Daniel R. Zirker
*Attorney, Agent, or Firm*—Gary L. Griswold; Walter N. Kirn; Steven E. Skolnick

[57] ABSTRACT

A tear resistant film comprises more than five layers situated one on the other in a parallel array. The layers are individually selected from a stiff polyester or copolyester, a ductile polymeric material, and optionally, an intermediate material. The stiff polyester or copolyester is oriented in at least one direction. Tear resistance may be measured in a Graves area test and reflects the ability of the film to absorb energy. The films of the invention are useful in many articles including security control laminates for glazing members.

43 Claims, 6 Drawing Sheets

U.S. PATENT DOCUMENTS

| | | | |
|---|---|---|---|
| 3,891,486 | 6/1975 | Willdorf | 156/71 |
| 3,899,621 | 8/1975 | Willdorf | 428/216 |
| 3,907,926 | 9/1975 | Brown et al. | 260/860 |
| 3,949,134 | 4/1976 | Willdorf | 428/215 |
| 3,956,559 | 5/1976 | Willdorf | 428/214 |
| 4,011,358 | 3/1977 | Roelofs | 428/287 |
| 4,028,475 | 6/1977 | Willdorf | 428/215 |
| 4,075,386 | 2/1978 | Willdorf | 428/216 |
| 4,081,581 | 3/1978 | Littell, Jr. | 428/138 |
| 4,091,150 | 5/1978 | Roelofs | 428/57 |
| 4,247,599 | 1/1981 | Hopper | 428/216 X |
| 4,349,469 | 9/1982 | Davis et al. | 524/765 |
| 4,540,622 | 9/1985 | Brunion et al. | 428/216 |
| 4,540,623 | 9/1985 | Im et al. | 428/220 |
| 4,563,388 | 1/1986 | Bonk et al. | 428/304.4 |
| 4,584,229 | 4/1986 | Bourelier et al. | 428/216 |
| 4,636,442 | 1/1987 | Beavers et al. | 428/480 |
| 4,643,943 | 2/1987 | Schoenberg | 428/339 |
| 4,652,275 | 3/1987 | Bloecher et al. | 51/298 |
| 4,705,707 | 11/1987 | Winter | 428/35 |
| 4,729,927 | 3/1988 | Hirose et al. | 428/430 |
| 4,749,617 | 6/1988 | Canty | 428/332 |
| 4,799,939 | 1/1989 | Bloecher et al. | 51/293 |
| 4,906,523 | 3/1990 | Bilkadi et al. | 428/327 |
| 4,908,278 | 3/1990 | Bland et al. | 428/500 |
| 4,911,963 | 3/1990 | Lustig et al. | 428/36.91 |
| 4,929,714 | 5/1990 | Trotter et al. | 525/437 X |
| 4,939,009 | 7/1990 | Beavers et al. | 428/35.2 |
| 4,940,616 | 7/1990 | Yatsu et al. | 428/35.7 |
| 4,945,002 | 7/1990 | Tanuma et al. | 428/425.6 |
| 4,965,108 | 10/1990 | Biel et al. | 428/35.7 |
| 4,965,135 | 10/1990 | Im et al. | 428/412 |
| 4,976,898 | 12/1990 | Lustig et al. | 264/22 |
| 5,024,895 | 6/1991 | Kavanagh et al. | 428/437 |
| 5,034,263 | 7/1991 | Maier et al. | 428/215 |
| 5,059,470 | 10/1991 | Fukuda et al. | 428/142 |
| 5,304,224 | 4/1994 | Harmon | 51/295 |
| 5,355,636 | 10/1994 | Harmon | 51/295 |

TEAR RESISTANT MULTILAYER FILMS AND ARTICLES INCORPORATING SUCH FILMS

This is a continuation of application No. 07/955,357 filed Oct. 1, 1992, now abandoned.

BACKGROUND OF THE INVENTION

1. Field of the Invention

This invention relates to multilayer films, and, more particularly, to tear resistant multilayer films comprising alternating layers of relatively stiff and ductile polymeric materials.

2. Description of the Related Art

Traditionally, "tear resistance" has described the ability of a film to resist continuing to tear once a tear has been started. Trash and grocery bags, often based on polyolefins such as polyethylene, are examples of films that are conventionally considered to be tear resistant. These films have considerable stretch which enables them to resist advancing an already formed tear. By "stretch" it is meant that the films have a low tensile modulus and are not dimensionally stable.

Also known are films which are relatively stiff In this regard, "stiff" refers to films which cannot be stretched significantly without breaking; that is, films which are dimensionally stable, creep-resistant (stretch resistant), and of high modulus. Examples of stiff, dimensionally stable, high modulus materials are certain packaging films such as cellophane, polyesters and biaxially oriented polypropylene. However, these films have low tear resistance. That is, once a tear has been started, the film continues to tear quite easily.

There are numerous applications where stiff, tear resistant films would be desirable. For example, films which provide sign faces and building awnings must be tear resistant to have a useful life. On the other hand, these films must also be relatively stiff so that they will not billow in the wind or sag with age.

Backings for abrasive sanding belts experience harsh operating conditions and must resist tearing. However, sanding belts which stretch are undesirable because they may not fit securely on the sander and may work free under normal use.

Angioplasty balloons for expanding blood vessels during surgery require stiff, tear resistant films. The balloons cannot readily shatter (i.e., tear) during use. The balloons must also inflate to a controlled size and should not stretch to a larger size.

For certain tapes, stiff, tear resistant backings would be desirable. Such backings would not readily continue to tear if inadvertently nicked or cut when dispensed. At the same time, the backings would be stretch resistant which could enhance the stability of articles taped therewith.

Films for shatterproofing windows need to be tear resistant. However, the performance of such films would be enhanced if the films were also stiff and tear resistant as the combination of these properties would help the film to absorb energy in the event of a window shattering impact.

Numerous packaging films are disclosed in the prior art. U.S. Pat. No. 3,188,265, "Packaging Films" issued Jun. 8, 1965 to R. Charbonneau, et al. discloses a heat-sealable film comprising polyethylene extruded onto a web of oriented polyethylene terephthalate. U.S. Pat. No. 4,705,707 "Polyethylene/Polyester Non Oriented Heat Sealable, Moisture Barrier Film and Bag," issued Nov. 10, 1987 to J. Winter discloses a moisture barrier film useful in microwaveable food pouches. The film comprises three and five layer nonoriented structures of polyethylenes and polyesters or copolyesters.

U.S. Pat. No. 4,965,108 "Low Temperature Impact and Puncture Resistant Thermoplastic Films and Bags Therefrom," issued Oct. 23, 1990 to E. Biel et al. discloses multilayer film and bag structures comprising a polypropylene copolymer inner layer, an outer layer (e.g., a polyester or a polyamide), and a polypropylene based bonding resin therebetween.

U.S. Pat. No. 4,636,442 "Laminated Structures of Polyethylene Terephthalate and Elastomeric Copolyesterethers," issued Jan. 13, 1987, to R. Beavers et al. discloses multilayer films reportedly having improved flex-crack resistance. The films are based on polyethylene terephthalate and elastomeric copolyesterethers. Biaxially oriented three and five layer films in which the amount of copolyesterether is from about 5 to about 75 weight % (preferably 10 to 60 weight %) are disclosed.

U.S. Pat. No. 4,939,009 "Multilayer Sheets Having Excellent Adhesion," issued Jul. 3, 1990, also to R. Beavers et al., discloses three and five layer films based on polyolefins and copolyesterethers with tie layers therebetween.

U.S. Pat. No. 4,729,927 "Polyester Packaging Material," issued Mar. 8, 1988, to M. Hirose et al. discloses a packaging material comprising polyethylene terephthalate and a second material based on polyethylene isophthalate copolymerized with an aliphatic hydroxycarboxylic acid having up to eight carbon atoms. Reportedly, the number of layers is not particularly critical, although films with up to five layers are said to be preferred.

Japanese Kokai Patent No. 2-270553 "Multilayer Plastic Sheet with Gas Barrier Feature," published Nov. 5, 1990 discloses multilayer films based on layers of saponified ethylene/vinyl acetate copolymers, modified polyolefin adhesives, and thermoplastic polyesters.

Impact resistant and/or shatterproof security films for windows are also known. For example, U.S. Pat. No. 3,899,621 "Security Film for Shatter-Proofing Windows," issued Aug. 12, 1975 to M. Willdorf discloses three and five layer films comprising layers of polyesters and polyurethanes. Preferably, the polyester layers range in thickness from 0.5 to 5 mils and the polyurethane layers range in thickness from 0.2 to 0.4 mil. U.S. Pat. No. 3,891,486 "Process for Producing Solar Control Window," issued Jun. 24, 1975, also to M. Willdorf, discloses a solar control film comprising a pair of polyester (e.g., polyethylene terephthalate) layers each from 0.25 to 1 mil thick with a vapor-deposited aluminum coating and an adhesive therebetween.

U.S. Pat. No. 4,945,002 "Impact-Resisting Anti-Lacerative Window Units," issued Jul. 31, 1990 to I. Tanuma et al. discloses a three layer film comprising two exterior layers (e.g., an ethylene/vinyl acetate copolymer, an ethylene/vinyl acetate/triallyl isocyanurate terpolymer, a polybutyl butyral, a polyvinylformal, or a polyurethane), and an intermediate layer (e.g. polyethylene terephthalate, polyamides, polyester polyethers, polysulfones or polyimides) therebetween. The film is sandwiched between a pair of transparent glass or plastic plates.

Various tapes are also known. For example, U.S. Pat. No. 4,091,150 "Coextruded Polyester Splicing Tape," issued May 23, 1978 to G. Roelofs discloses a multilayer tape comprising a support film formed from a tough, flexible polyester (e.g. polyethylene naphthalate or polyethylene terephthalate) which is coextruded with an adhesion promoting polyester. A thermoset adhesive is adherently bonded to the adhesion promoting polyester.

U.S. Pat. No. 4,908,278 "Severable Multilayer Thermoplastic Film," issued Mar. 13, 1990 to Bland et al. discloses a multilayer film which may be easily and precisely cut in a straight line. The film comprises alternating layers of brittle and ductile materials. Japanese Kokoku Patent Publication No. 63-5394 "Laminate Film," published Oct. 26, 1988, discloses three and five layer tape backing films comprising layers of different polyesters. Reportedly, the films have good manual tearing properties.

U.S. Pat. No. 4,540,623 "Coextruded Multi-layer Articles," issued Sep. 10, 1985 to J. Im et al. discloses an impact resistant multilayer laminate comprising alternating layers (preferably at least about 40 layers) of coextruded polymeric thermoplastics wherein one of the materials contains a carbonate polymer. Suggested uses include glazing applications for windows and signs.

European Patent Application No. 0,426,636 "Iridescent Film with Thermoplastic Elastomeric Components," published May 8, 1991 discloses a transparent thermoplastic film of at least ten layers. The adjacent layers differ in refractive index and at least one of the layers is based on a thermoplastic elastomer resin. The layers range in thickness from 30 to 500 nanometers.

SUMMARY OF THE INVENTION

In general, this invention relates to a tear resistant film comprising more than five layers situated one on the other in a parallel array. The layers occur essentially randomly in the array and are individually selected from a stiff polyester or copolyester and a ductile polymeric material. Preferably, the stiff polyester or copolyester layers are oriented in at least one direction and, more preferably, are biaxially oriented.

By "tear resistant" it is broadly meant that a film according to the invention demonstrates a Graves area in one direction of the film which exceeds the Graves area in the same direction for a single layer film comprising only the stiff polyester/copolyester of the multilayer film, the single layer film being processed in the same manner as and to substantially the same thickness as the multilayer film. Preferably, multilayer films according to the invention demonstrate a Graves area in one direction of the film equal to at least about 40+0.4(x) kpsi % wherein x is the nominal thickness of the film in microns. More specifically, Graves area is obtained by mathematically integrating the area beneath the curve in a graphical plot of the stress (as measured in kpsi) experienced by the film versus the strain (as measured in Graves elongation which is defined more fully below) that the film undergoes during a test in which a film sample specifically shaped for the Graves area test is clamped between opposed jaws that are moved apart at a constant rate to concentrate the tearing stresses in a small area. Thus, Graves area is a combined measure of the film's tensile modulus (i.e., the film's stiffness and dimensional stability) and the ability of the film to resist advancing a tear. Consequently, Graves area may be regarded as a measure of the total energy required to cause the film to fail; that is, the ability of the film to absorb energy.

Moreover, preferred multilayer films desirably exhibit a Graves elongation at break (defined below) of at least 20%, more preferably at least 40% during the Graves area test. In addition, preferred multilayer tear resistant films according to the invention demonstrate a tensile modulus (as measured in a conventional tensile test) of at least 175 kpsi (1,208 MPa), more preferably at least 240 kpsi (1,656 MPa), and most preferably at least 450 kpsi (3,105 MPa) in at least one direction of the film.

Both the thickness of the film and the individual layers which comprise the film may vary over wide limits. Films according to the invention typically have a nominal thickness of from about 7 to 500 μm, more preferably, from about 15 to 185 μm. The individual layers of stiff polyester or copolyester typically have an average nominal thickness of at least about 0.5 μm, more preferably from greater than 0.5 μm to 75 μm and, most preferably, from about 1 to 25 μm. It is preferred that the ductile material layers be thinner than the stiff material layers. The ductile material layers may range in average nominal thickness from greater than about 0.01 μm to less than about 5 μm, more preferably from about 0.2 to 3 μm.

Similarly, the exact order of the individual layers is not critical. The total number of layers may also vary substantially. Preferably, the film comprises at least 5 layers, more preferably from greater than 5 layers to 35 layers, and most preferably 13 layers.

Stiff polyesters and copolyesters useful in the invention are typically high tensile modulus materials, preferably materials having a tensile modulus, at the temperature of interest, greater than 200 kpsi (1,380 MPa), and most preferably greater than 400 kpsi (2,760 MPa). Particularly preferred stiff polyesters and copolyesters for use in films according to the invention comprise the reaction product of a dicarboxylic acid component selected from the group consisting of terephthalic acid, naphthalene dicarboxylic acid such as dimethyl 2,6 naphthalene dicarboxylic acid, and ester derivatives thereof, and a diol component selected from the group consisting of ethylene glycol and 1,4-butanediol. Additional stiff copolyesters based on these materials may be provided by copolymerizing these ingredients with one or more other diacids and/or one or more other diols. Ductile materials useful in the practice of the invention generally have a tensile modulus of less than 200 kpsi (1,380 MPa) and a tensile elongation (defined below), at the temperature of interest, of greater than 50%, preferably greater than 150%. The ductile polymer may be selected from, for example, ethylene copolymers, polyesters, copolyesters, polyolefins, polyamides and polyurethanes. However, a preferred ductile polymer is a copolyester comprising the reaction product of cyclohexane dicarboxylic acid (or ester derivatives thereof), cyclohexane dimethanol and polytetramethylene glycol.

Surprisingly, beneficial improvements in the tear resistance of films comprising alternating layers of stiff and ductile materials are realized when the ductile material provides less than 5 weight % of the film. Ductile material amounts of at least about 1 weight % (preferably at least about 2.6 weight %), up to about 10 to 20 weight % of the film may be useful.

Films according to the invention may optionally include a layer of an intermediate material disposed between otherwise adjacent layers of the stiff and ductile polymers. Useful intermediate materials may be selected from a wide variety of polymers and, in some cases, may be selected to enhance the adhesion between the otherwise adjacent stiff and ductile layers. One or more functional layers may also be applied to one or both of the major surfaces of the film.

Multilayer films according to the invention provide an improved combination of stiffness and tear resistance especially when compared to films comprising only a single layer of one of the materials or single layer blends of both materials. Films according to the invention are useful in a wide variety of products, including, for example, sign faces and backings for coated abrasive articles.

The multilayer tear resistant films of the invention are particularly useful as security control laminates for shatter-proofing glazing members against impact or explosion. In one embodiment of this application, the invention pertains to a security control laminate comprising a first tear resistant film having a first face and a first layer of adhesive on the first face for bonding the laminate to a glazing member. Typically, the adhesive coated face of the tear resistant film is temporarily disposed on a removable release liner which is discarded during application of the laminate to the glazing member. The security control laminate may further comprise means for absorbing ultraviolet radiation such as a coating layer interposed between the first tear resistant film and the layer of adhesive. Security control laminates according to the invention may also comprise a dyed film (bonded to the second face of the tear resistant film) and an abrasion resistant coating on the otherwise exposed surface of the dyed film.

In other embodiments, the security control laminate may comprise a second tear resistant film which is adhesively bonded to the first film. Such constructions may also include ultraviolet radiation absorbent and abrasion resistant coatings. Also contemplated is the inclusion of a metalized layer for imparting solar control properties to the security control laminate. A metalized layer may comprise an optically clear film having a layer of aluminum, gold, silver, copper, nickel and the like thereon. The security control laminate may be applied to a single glazing member or positioned between two glazing members. The glazing member(s) can be mounted within a frame to which the security control laminate may be optionally secured.

BRIEF DESCRIPTION OF THE DRAWINGS

The invention will be more fully understood with reference to the following drawings in which similar reference numerals designate like or analogous components throughout and in which.

DETAILED DESCRIPTION OF THE PREFERRED EMBODIMENTS

The invention relates to tear resistant multilayer films comprising interdigitated layers of at least one ductile material, at least one stiff material and, optionally, at least one intermediate material. The exact order of the individual layers is not critical provided that at least one layer of a stiff material and at least one layer of a ductile material are present.

Examples of some film structures within the scope of the invention include:

$S(DS)_x$ $D(SD)_x$ $D(ISID)_y$ $S(IDIS)_y$ wherein S is the stiff material, D is the ductile material, I is the optional intermediate material, x is a whole number of at least 2 (preferably at least 4 and more preferably about 6), and y is a whole number of at least 1 (preferably at least 2 and more preferably about 3). Other layer arrangements in which the order is essentially random are also possible. The two outer layers may be the same or may be different. The individual stiff layers may be comprised of the same or different materials so long as the materials are stiff. Similarly, the individual ductile layers may be comprised of the same or different materials. Preferably, each stiff layer is provided by the same material and each ductile layer is the same so as to facilitate film production.

Figure 1:
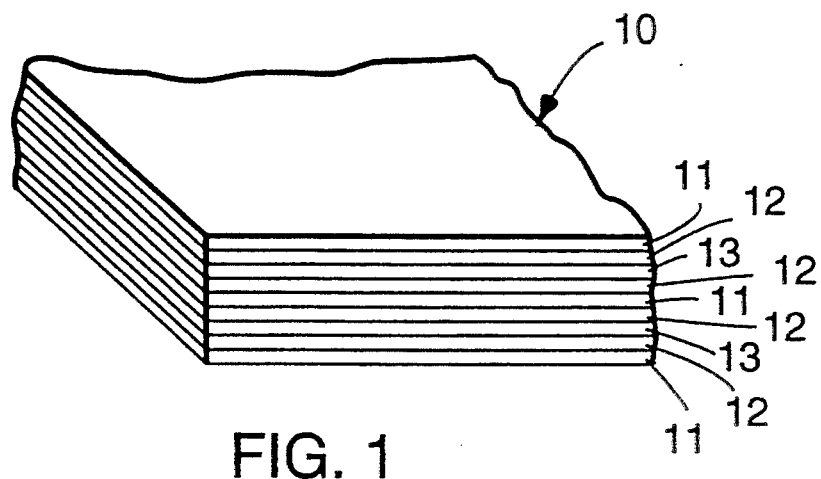
FIG. 1 is an enlarged perspective view of a multilayer tear resistant film according to the invention.

A film 10 according to the invention and having the structure $D(ISID)_y$, where y is 2 is shown in FIG. 1. Film 10 includes 9 alternating layers of ductile material 11, intermediate material 12, and stiff material 13. The two outer layers are formed of ductile material 11. However, the structure of FIG. 1 could be such that either stiff material 13 or intermediate material 12 provides the outer layers. Preferably the film comprises at least 5 layers, more preferably from more than 5 layers (e.g., 9 layers) to 35 layers, and most preferably about 13 layers, although as many layers as desired (e.g., 61 layers) may be employed.

The thickness of each layer and the total thickness of the film may be varied over wide limits within the scope of the invention. The practical thickness of the film is limited only by the handling characteristics desired. The lower useful practical limit is that at which the film becomes too flimsy to be readily handled or is no longer sufficiently tear resistant while the upper useful limit is that at which the film becomes overly rigid and too difficult to process. Within these constraints, films according to the invention typically have a nominal thickness in the range of from about 7 to 500 microns (i.e., micrometers) (μm) and, more preferably, from about 15 to 185 μm.

The thickness of the individual layers may also vary over a wide range, it being understood that as the number of layers increases at a constant or decreasing film thickness, the thickness of each layer declines. The individual layers of stiff material typically have an average nominal thickness of at least about 0.5 μm, more preferably from 0.5 μm to 75 μm, and most preferably from about 1 to 25 μm. Although the thickness of each layer may be the same, it is preferred that the ductile material layers be thinner than the stiff material layers. The ductile material layers may range in average nominal thickness from greater than about 0.01 μm to less than about 5 μm, more preferably, from about 0.2 to 3 μm. All film and layer thickness stated herein are nominal thicknesses which may be measured according to the procedure set forth in ASTM Test Method D 1004.

Stiff materials useful in the practice of the invention comprise polyesters which are the reaction product of dicarboxylic acid (or ester derivatives thereof) and diol components. Preferably, the dicarboxylic acid component is either terephthalic acid or naphthalene dicarboxylic acid (such as dimethyl 2,6-naphthalene dicarboxylic acid) or ester derivatives thereof, and the diol component is either ethylene glycol or 1,4-butanediol. Accordingly, preferred polyesters for use as the stiff material include polyethylene terephthalate, polyethylene naphthalate, polybutylene terephthalate, and polybutylene naphthalate, as well as blends thereof.

Additional stiff copolyesters based on these materials may be made by copolymerizing the terephthalic and/or naphthalene dicarboxylic acid component(s) with one or more other diacids, including adipic, azelaic, sebacic, isophthalic, dibenzoic and cyclohexane dicarboxylic acids. Similarly, various stiff copolyesters may be formed by copolymerizing the ethylene glycol and/or 1,4-butanediol component(s) with one or more other diols such as diethylene glycol, propanediol, polyethyelene glycol, polytetramethylene glycol, neopentyl glycol, cylcohexane dimethanol, 4-hydroxy diphenol, bisphenol A, and 1,8-dihydroxy biphenyl. Useful stiff materials may also be provided by incorporating one or more other diacids and/or one or more other diols into the polymerization mixture. The amount of such other materials may be varied over wide limits so long as the resulting polymer is stiff.

As used herein, "stiff" means stretch resistant, creep resistant and dimensionally stable. More particularly, "stiff" materials according to the invention are high tensile modulus polyesters and copolyesters, preferably materials having a tensile modulus, at the temperature of interest, greater than 200 kpsi (kpsi=1000 pounds per square inch=6.9 MPa) (1,380 megaPascals (MPa)), more preferably greater than 300 kpsi (2,070 MPa), and most preferably greater than 400 kpsi (2,760 MPa). In some instances, orientation may be necessary to achieve the desired tensile modulus.

Tensile modulus of the stiff material is determined according to ASTM Test Method D 822-88 using a 4 inch (10.2 centimeters (cm)) gauge length and a separation rate of 2 inches/minute (5 cm/min). The "temperature of interest" means the average temperature at which the film (or a structure incorporating the film) is intended to be used. ASTM D 882-88 specifies a test temperature of 23° C.±2° C. If the temperature of interest for the multilayer film is within this range, the ASTM test procedure is followed as published. If, however, the temperature of interest is outside this range, then the test procedure is followed with the exception that the test is performed at the temperature of interest.

Ductile materials useful in the invention generally have a tensile modulus of less than 200 psi (1,380 MPa) and a tensile elongation, at the temperature of interest as defined above, of greater than 50% preferably greater than 150%. Tensile modulus and tensile elongation of the ductile material are measured in accordance with ASTM Test Method D 882-88, a tensile test, using a 4 inch (10.2 cm) gauge length and a separation rate of 5 inches/minute (12.7 cm/min). "Tensile elongation," as used herein, refers to the elongation at break of the ductile material as measured during the referenced tensile test procedure.

Suitable ductile materials include ethylene copolymers such as ethylene/vinyl acetate, ethylene/acrylic acid, ethylene/methyl acrylate, ethylene/methacrylic acid, ethylene/methyl methacrylate, ethylene/ethyl acrylate, ethylene/ethyl methacrylate and blends and ionomers thereof. Ethylene/olefin copolymers in which the olefin component is provided by propylene, butylene or other higher order alpha-olefins may also be used. Preferably, the nonethylene portion of the copolymer comprises from 5% to 30% by weight of the copolymer. Particularly useful are ethylene/vinyl acetate copolymers having at least 6 mole % vinyl acetate. Examples of suitable commercial materials include the ELVAX series of ethylene/vinyl acetate copolymers (E.I. dupont de Nemours) and the ULTRATHENE series of ethylene/vinyl acetates (Quantum Chemical Corp.).

Suitable ductile materials also include a wide variety of polyesters and copolyesters which comprise the reaction product of dicarboxylic acid (including ester derivatives thereof) and diol components. Illustrative dicarboxylic acids include terephthalic acid, isophthalic acid, naphthalene dicarboxylic acid, adipic acid, azelaic acid, sebacic acid, and cyclohexane dicarboxylic acid. Diols with which these diacids may be polymerized include ethylene glycol, diethylene glycol, propanediol, butanediol, neopentyl glycol, polyethylene glycol, polytetramethylene glycol, poly ε-caprolactone, polyester glycol and cyclohexane dimethanol. The relative amounts of the diacid and diol components may be varied over wide limits.

A particularly preferred ductile copolyester comprises 60 mole equivalents of terephthalic acid and 40 mole equivalents of sebacic acid to provide the dicarboxylic acid component, and 100 mole equivalents of ethylene glycol for the diol component. Another preferred copolyester comprises 100 mole equivalents cyclohexane dicarboxylic acid for the dicarboxylic acid component, and 91 mole equivalents cyclohexane dimethanol and 9 mole equivalents polytetramethylene glycol for the diol component. Examples of commercially available copolyester resins which may be used to provide the ductile material include ECDEL-9965, ECDEL-9966 and ECDEL-9967 (Eastman Chemical Products, Inc.).

Suitable ductile materials further include polyolefins such as polyethylene, polypropylene and other higher order polyolefins.

Also useful as ductile materials are polyamides in which the dicarboxylic acid component and the diamine component (of which the polyamides are the reaction product) each individually have from 2 to 12 carbon atoms. The polyamides may be copolymerized with various long chain aliphatic glycols such as polytetramethylene glycol or polyethylene glycol. The glycol may comprise up to about 25% by weight of the polyamide. Useful polyamides include the PEBAX family of resins commercially available from Atochem.

Polyurethanes comprising the reaction product of various diiosocyanates or triisocyanates and active hydrogen containing compounds may also be successfully employed as ductile materials. Useful diisocyanates and triisocyanates include hexamethylene diiisocyanate, trans-cyclohexane 1,4-diisocyanate, isophorone diiisocyanate, 2,2,4- and 2,4,4-trimethylhexamethylene diiisocyanate, m-tetramethylxylene diisocyanate, p-tetramethylxylene diisocyanate, dicyclohexylmethane 4,4-diisocyanate, dimethyl diisocyanate, m-phenylene diisocyanate, p-phenylene diisocyanate, toluene 2,4-diisocyanate, toluene 2,6 diisocyanate, naphthalene 1,5-diisocyanate, diphenylmethane 2,4'-diisocyanate, diphenylmethane 4,4'-diisocyanate, polymethylene polyphenylene polyisocyanate, triphenylmethane 4,4',4"-triisocyanate, isocyanatoethyl methacrylate, 3-isopropenyl-α,α dimethylbenzyl-isocyanate, and thiophosphoric acid, tris(4-isocyanatophenyl ester), as well blends or mixtures thereof.

Useful active hydrogen containing materials include diols (e.g., 1,4-butanediol, 1,6-hexanediol, castor oil), polyester polyols, polyether polyols, and polyfunctional primary or secondary amines. The equivalent ratio of diisocyanate to active hydrogen is about 1:1.

It has been found that relatively small amounts of the ductile material (i.e., amounts of less than 5 weight percent), relative to the stiff material, can greatly improve the tear resistance of multilayer films made therewith. However, as little as about 1 weight percent (weight % or wt. %), preferably at least about 2.6 weight %, of the ductile material is believed to be sufficient. Ductile material loadings up to about 10 to 20 weight may be used although exceeding this range may reduce the tear resistance of films made therewith.

Preferably, films according to the invention have an interlayer adhesion of at least 0.1 pounds/inch width (piw) (18 grams/cm (g/cm)), more preferably at least 0.5 piw (90 g/cm). Peel adhesion may be tested using ASTM Test Method F904-84 and a separation rate of 2 inches/minute (5 cm/min.). What constitutes an acceptable interlayer adhesion will be dictated in large part by the application intended for the multilayer film. Thus, if the film provides the backing for an abrasive sanding disc which may encounter high shear forces in use, an interlayer adhesion of at least 1 piw (180 g/cm), preferably at least 3 piw (540 g/cm), may be necessary. On the other hand, for static single use applications such as shatterproof or anti-lacerative window films, less interlayer adhesion such as 0.01 piw (2 g/cm) may be acceptable. More or less interlayer adhesion may be desirable depending on the failure mode of the film as it tears.

Because films of the invention comprise a number of interleaved layers of different materials, it is sometimes necessary to provide a means for increasing the interfacial adhesion between adjacent layers to achieve the desired interlayer adhesion. Several techniques may be used. For example, when the interfacial adhesion between adjacent layers of stiff and ductile components is considered inadequate, a low concentration (e.g. about 0.01 to 10%) of a component which contains an appropriate functional group may be incorporated into either or both of the ductile and stiff materials to promote interlayer adhesion. This may be accomplished by, for example, reacting or blending the functional group-containing component with the ductile or stiff material or by copolymerizing or blending it with the monomers used to provide the ductile or stiff material. Examples of useful adhesion-promoting, functional group-containing components include acrylic acid, methacrylic acid, maleic anhydride, vinyl pyridine, oxazoline-containing materials (such as polyethyl oxazoline), and the like.

Alternatively, a layer of an appropriate intermediate material may be utilized as a tie layer between the layers of stiff and ductile materials. The intermediate layer may comprise a ductile material, a stiff material, or a rubbery material. The intermediate layer could also comprise a blend of stiff and ductile materials. Ductile and stiff materials are described above. Rubbery materials manifest no significant yield point, but typically display a sigmoidal rise in elongation with applied load until rupture occurs at high strain. Whatever the precise nature of the intermediate material, if it is being used as a tie layer, it must enhance the adhesion between the stiff and ductile materials. Combinations of these approaches, or even other approaches may also be used.

Many materials are useful as the intermediate layer. They include ethylene/vinyl acetate copolymers, preferably containing at least about 10% by weight vinyl acetate and a melt index of about 10, e.g., the ELVAX series of materials (duPont); carboxylated ethylene/vinyl acetate copolymers, e.g., CXA 3101 (duPont); copolymers of ethylene and methyl acrylate, e.g., POLY-ETH 2205 EMA (available from Gulf Oil and Chemicals Co.), and ethylene methacrylic acid ionomers e.g., SURYLN (duPont); ethylene/acrylic acid copolymers; and maleic anhydride modified polyolefins and copolymers of polyolefins, e.g., MODIC resins (available from Mitsubishi Chemical Company).

Other materials useful as the intermediate layer include polyolefins containing homogeneously dispersed vinyl polymers such as the VMX resins available from Mitsubishi (e.g., FN70, an ethylene/vinyl acetate-based product having a total vinyl acetate content of 50% and JN-70, an ethylene/vinyl acetate-based product containing 23% vinyl acetate and 23% dispersed poly(methyl methacrylate)), POLYBOND (believed to be a polyolefin grafted with acrylic acid) available from Reichold Chemicals Inc., and PLEXAR (believed to be a polyolefin grafted with polar functional groups) available from Chemplex Company. Also useful are copolymers of ethylene and methacrylic acid such as the PRIMACOR family available from Dow Chemical Co. and NUCREL available from dupont. Other ethylene copolymers such as ethylene/methyl methacrylate, ethylene/ethyl acrylate, ethylene/ethyl methacrylate and ethylene/n-butyl acrylate may be used.

The various polyesters and copolyesters described above as being suitable ductile materials may also function as an intermediate layer.

The intermediate layer preferably comprises from about 1 to 30 (most preferably from about 2 to 10) weight % of the film. The nominal thickness of the intermediate layer can vary over a wide range depending on the number of layers in the multilayer film and the overall thickness of the film, but preferably is from about 0.01 $\mu$m to less than about 5 $\mu$m, more preferably from about 0.2 to 3 $\mu$m.

Alternatively, adjacent layers of stiff and ductile materials may be treated with radiation, such as ultraviolet, electron beam, infrared or microwave radiation, to improve adhesion.

Each of the stiff, ductile and intermediate layer materials may further include or be supplemented with various adjuvants, additives, colorants, extenders, antioxidants, thermal stabilizers, ultraviolet light stabilizers, plasticizers, slip agents, etc. that are conventionally and customarily used in the manufacture of such materials or films made therewith. These supplemental materials may comprise up to about 5 weight % of the total weight of the layers into which they are incorporated so long as the tear resistance of the film is not significantly adversely affected.

Figure 2:
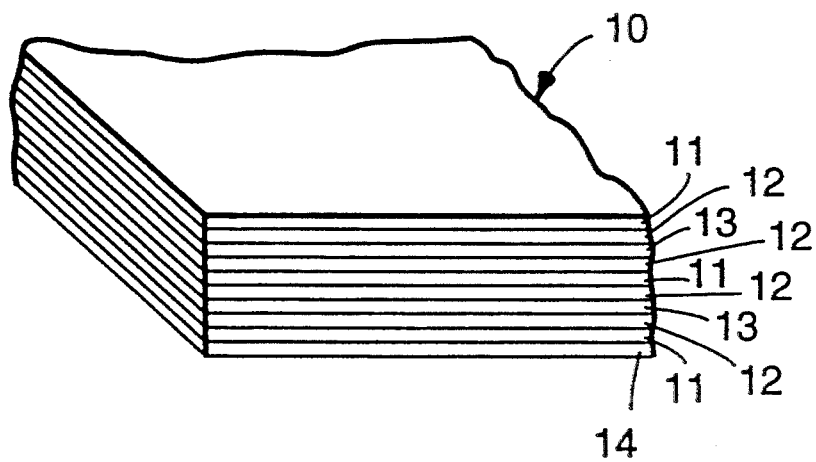
FIG. 2 is an enlarged perspective view of the film of FIG. 1 and further comprising a functional layer applied to one surface thereof.

If desired, a functional layer may be applied to one or both of the major surfaces of the film. For example, an adhesive 14 may be applied to at least one of the major surfaces as shown in FIG. 2. Adhesive 14 may be activatable by pressure, heat, solvent or any combination thereof and may be of any type such as an acrylate, a rubber/resin, or a silicone. Other functional layers, for example, an abrasive material (optionally in a binder), a radiation (e.g., light) sensitive or blocking layer, an ink-receptive layer, a magnetic recording media, a top coat, a slip agent layer, a vapor coated material, a primer layer, a reflective layer, or a moisture or gas barrier layer may be employed. Other functional layers may also be used. The functional layers may be employed singly or in combination with other functional layers on one or both sides of the film.

To modify the surface properties of the film or to promote adhesion of any subsequently applied functional layer, the film may be pretreated with a primer coating, activated by flame or corona discharge or other surface treatments, or a combination of these approaches.

Films according to the invention may be readily made using techniques known in the art. One such technique is disclosed in U.S. Pat. No. 3,565,985 (Schrenk et al.). In making films of the invention, melt coextrusion by either the multimanifold die or the feedblock method in which individual layers meet under laminar flow conditions to provide an integral multilayer film may be used. More specifically, separate streams of the ductile, stiff and, optionally, intermediate materials in a flowable state are each split into a predetermined number of smaller or sub-streams. These smaller streams are then combined in a predetermined pattern of layers of stiff, ductile and, optionally, intermediate materials to form an array of layers of these materials in a flowable state. The layers are in intimate contact with adjacent layers in the array. This array generally comprises a tall stack of layers which is then compressed to reduce its height. In the multimanifold die approach, the film width remains constant during compression of the stack while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used.

In manufacturing the films the materials may be fed such that any one of the three constitutes the outer layer. The two outer layers often comprise the same material. Preferably, the materials comprising the various layers are processable at the same temperature and have similar melt viscosities so as to avoid degrading a lower melting material. Accordingly, residence time and processing temperatures may have to be adjusted depending on the characteristics of the materials of each layer.

Other manufacturing techniques such as lamination, coating or extrusion coating may be used in assembling multilayer films according to the invention. For example, in lamination, the various layers of the film are brought together under temperature and/or pressure (e.g., using heated laminating rollers or a heated press) to adhere adjacent layers to each other. In extrusion coating, a first layer is extruded onto either a cast web, a monoaxially oriented film or a biaxially oriented film and subsequent layers are sequentially coated onto the previously provided layers. Exemplary of this method is U.S. Pat. No. 3,741,253. Extrusion coating may be preferred over the melt coextrusion process described above where it is desirable to pretreat selected layers of the multilayer film or where the materials are not readily coextrudable.

It is preferred that the layers of the stiff material be oriented, either uniaxially or biaxially, at a temperature above their glass transition temperature so as to enhance the stiffness, modulus and creep resistance of the film. (For some uses, such as thermoforming applications, orientation of the stiff material layers would not be required.) Orientation of the ductile and intermediate layer materials is optional. Orientation may be accomplished by conventional methods typically used in the art such as mechanical stretching (drawing) or tubular expansion with heated air or gas. Typical draw ratios are in the range of 2.5 to 6 times in either or both of the machine and transverse directions. Greater draw ratios (for example, up to about 8 times) may be used if the film is oriented in only one direction. The film need not be stretched equally in the machine and transverse directions although this is preferred if balanced properties are desired.

The films may also be heat set by exposing the film to a temperature of about 10° to 150° C. below the melting temperature of the stiff component for about 4 to 15 seconds so as to increase the crystallinity, stiffness, modulus and creep resistance of the film while reducing its tendency to shrink. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film and perhaps its intended application but should not be selected so as to substantially degrade the tear resistant properties of the film. Within these constraints, a heat set temperature of about 135° to 205° C. is generally desirable for many of the applications in which the multilayer films of the invention are useful.

Various functional layers may be subsequently applied by lamination, extrusion coating or other known techniques. Various primers and/or surface treatments may be required as discussed more fully above.

Multilayer films according to the invention are both stiff (dimensionally stable, high modulus) and tear resistant. As explained above, stiff, high tensile modulus, creep resistant films such as cellophane, polyester and biaxially oriented polypropylene packaging films have little tear resistance. On the other hand, low tensile modulus, ductile materials such as polyolefin trash bags are tear resistant but are not dimensionally stable (i.e., they stretch readily). Films according to the invention provide the desirable properties of both high tensile modulus, stiff, dimensionally stable, creep resistant materials and low tensile modulus, ductile, tear resistant materials in a multilayer arrangement. As a result, multilayer films according to the invention offer both excellent tear resistance and dimensional stability. This beneficial amalgamation of properties is achieved because the different materials which comprise the films of the invention are assembled in a multilayer arrangement. As exemplified below, single layer blends of stiff and ductile polymers do not equally reflect the characteristics of films according to the invention.

Figure 3:
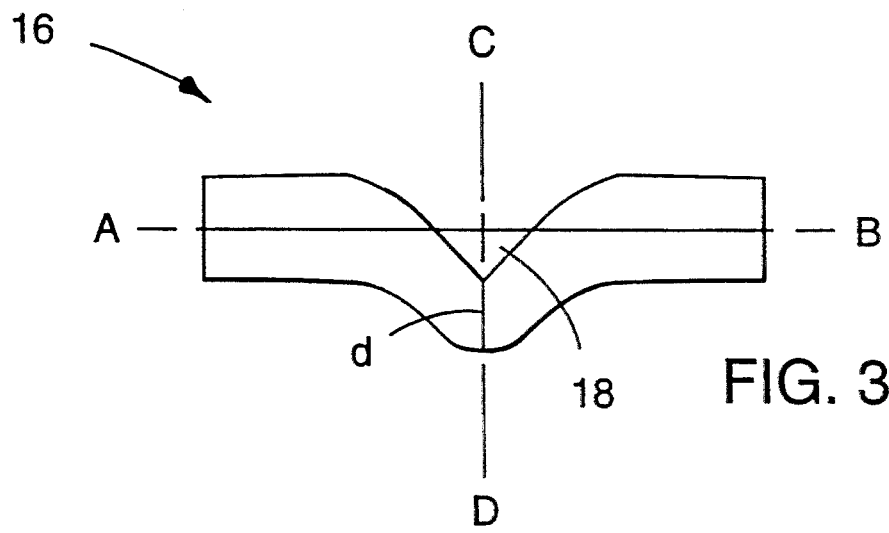
FIG. 3 is a schematic diagram of the shape of a film sample used to determine tear resistance of multilayer films according to the invention in a Graves area test.

The tear resistance of films according to the invention may be measured by ASTM Test Method D 1004 (also known as a Graves tear test). In a Graves tear test, a film sample 16 having the general shape shown in FIG. 3 (and described more explicitly in ASTM D 1004) is clamped between opposed jaws with an initial separation of 1 inch (2.5 cm). The jaws are then moved apart at a constant rate of 2 inches/minute (5 cm/min.) to tear the film in the area of the sample designated by the reference numeral 18. The tearing stresses imposed on the film are concentrated in area 18. The film may be torn in either the machine direction (i.e., the direction in which the film is extruded) or the transverse direction (i.e., perpendicular to the machine or extrusion direction). The tear direction corresponds to the orientation of area 18. More specifically, a pair of axes labeled A-B and C-D have been superimposed on film sample 16 in FIG. 3. The opposed jaws are moved along axis A-B to tear film sample 16 along axis C-D.

Figure 4:
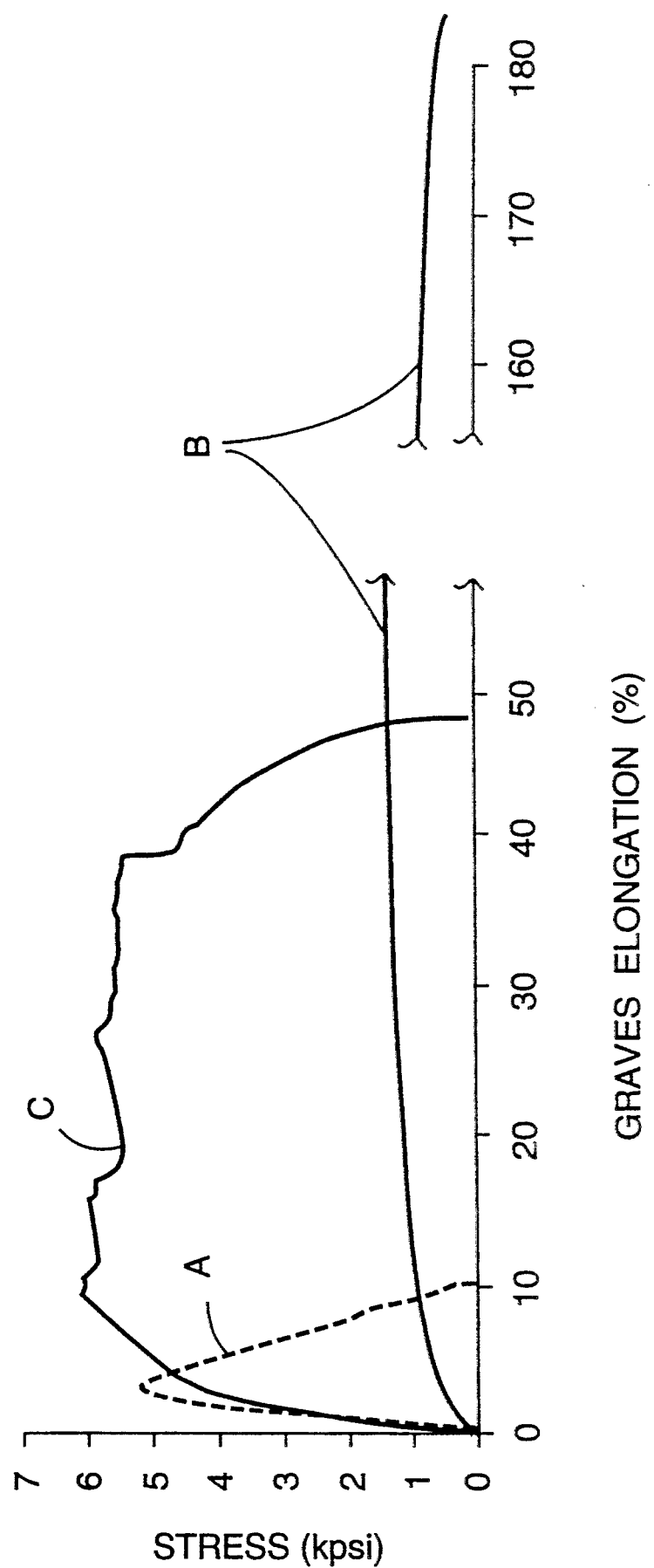
FIG. 4 is a graphical representation of stress vs. Graves elongation in a Graves area test for three different films.

With reference to FIG. 4, test data were recorded by graphically plotting the stress (as measured in kpsi) experienced by the film versus the strain (as measured by Graves elongation in %) that the film underwent during the test. "Stress" is defined as the recorded force divided by the product of the film thickness and the ligament width (distance "d" in FIG. 3). The expression "Graves elongation" as used herein refers to the elongation of a film in the tear direction as observed during a Graves area test and reflects the percent change in the jaw separation distance that occurs during the test relative to the jaw separation distance at the outset of the test. "Graves elongation at break" as used herein refers to the elongation of the film in % at its break point observed during the Graves area test. (It will be understood that Graves elongation at break differs from tensile elongation. Tensile elongation is measured during a tensile test and may be used to characterize ductile materials useful in the invention as explained above.)

With continued reference to FIG. 4, the plot (i.e., "curve") labeled with the letter "A" describes a film having a large maximum stress which falls off quickly as the film is stretched during the test. Curve A typifies the performance of a high modulus, stiff, dimensionally stable material which has poor tear resistance (as shown by the rapid falloff in stress as the film tears). Polyesters, cellophane, biaxially oriented polypropylene and similar packaging films perform similarly to curve A. Curve A was obtained by measuring the performance of the polyethylene terephthalate film of comparative example 15, described more fully below.

The curve labeled with the letter "B" describes the performance of a low modulus, ductile, readily stretchable, traditionally tear resistant material (as evidenced by the relatively high Graves elongation at break relative to curve A) because the film stretches rather than tears. The film is capable of sustaining only a relatively low stress. Plastic trash and grocery bags are common examples of films that would perform in a manner similar to that described by curve B. Curve B was obtained by measuring the performance of the linear low density polyethylene film of comparative example 16, described more fully below.

Curve "C" illustrates the performance of a multilayer film according to the invention and, more specifically, the film of example 39 described below. The maximum stress sustained by this film is similar to or exceeds the stiff film of curve A. However, the stress experienced by the curve C film of the invention does not fall off as rapidly as in the case of the curve A film. Thus, as compared to conventional polyester films of curve A, films according to the invention are more able to successfully withstand catastrophic tearing forces while being of substantially equal modulus. Such a property is highly desirable in certain applications, especially shatterproofing film for windows where the impact from breaking glass may be sudden and catastrophic. As compared to the low modulus films of curve B, films of the invention are able to sustain much higher stress. Thus, films according to the invention are both stiff (high modulus) and tear resistant.

In a Graves tear test, tear resistance data are conventionally reported as the maximum force experienced by the film. The data reported herein, however, are the total area (referred to herein at times as the "Graves area") beneath the stress-strain curve (i.e., the curves of FIG. 4) which is obtained by a mathematical integration of the curve. Graves area is regarded as a measure of the total energy required to cause the film to fail and, hence, a measure of the film's combined stiffness and tear resistance. Thus, Graves area may be regarded as a measure of the ability of the film to absorb energy. Graves area is reported herein in units of kpsi % wherein 1 kpsi % = 69 kilojoules/cubic meter. It will be understood that films with a relatively large Graves area have enhanced combined stiffness and tear resistance relative to those films with a relatively small Graves area.

As shown more fully below, Graves area may vary depending on whether the test is conducted in the machine or the transverse direction of the film. Also, Graves area generally increases with increasing film thickness. As a general characterization, a multilayer film may be regarded as tear resistant within the scope of the invention if it demonstrates a Graves area in one direction which exceeds the Graves area (in the same direction) of a single layer film that comprises only the stiff polyester or copolyester used in the multilayer film, the single layer film being processed (i.e., oriented, heat set etc.) in the same manner as the multilayer film and to a substantially equal film thickness. Preferably and more specifically, a multilayer film may be regarded as tear resistant within the scope of the invention if it demonstrates a Graves area at least equal to 40+0.4(x) kpsi % in one direction (e.g., the machine or the transverse direction) of the film, wherein x is the nominal thickness of the film in microns.

Furthermore, and related to their overall performance, multilayer films of the invention preferably have a tensile modulus (when tested according to ASTM Test Method D 882-88) of at least 175 kpsi (1,208 MPa) in one direction of the film, more preferably at least 240 kpsi (1,656 MPa), and most preferably at least 450 kpsi (3,105 MPa). However, the actual modulus which is desirable will depend on the application for which the film is intended, some applications preferring relatively stiffer films and others preferring relatively more flexible films. In addition, and also related to their overall performance, multilayer films according to the invention desirably demonstrate a Graves elongation at break of at least 20%, more preferably at least 40% in the tear direction of the film measured during the Graves area test.

The invention will be more fully appreciated with reference to the following, nonlimiting examples.

EXAMPLES 1 to 26

A series of multilayer films comprising alternating layers of a stiff material and a ductile material was formed by coextruding polyethylene terephthalate (PET) (differential scanning calorimetry (DSC) melting point of 256° C.; intrinsic viscosity of 0.60 deciliters per gram (dl/g) as measured in 60% phenol and 40% dichlorobenzene at 110° C.) as the stiff material with a copolyester as the ductile material. The copolyester comprised 40 mole % (or mole equivalents herein as the reactive systems are based on 100 equivalents) sebacic acid and 60 mole % terephthalic acid as the dicarboxylic acid components, and 100 mole % ethylene glycol as the diol component. The copolyester had an intrinsic viscosity in the range of 0.9 to 1.05 dl/g when measured in the same fashion as the PET. The ductile copolyester also displayed a tensile modulus of 14 kpsi (97 kPa) and a tensile elongation of 355% when tested according to ASTM D822-88 at room temperature but using a separation rate of 5 inches/minute (12.7 cm/minute).

The multilayer films were coextruded onto a chilled casting wheel and subsequently oriented sequentially 2.6 times in the machine direction (MD) at 80° C. and 4.2 times in the transverse direction (TD) at 99° C. The films were then heat set at 149° C.

The number of layers, the film thickness, and the weight percent of the ductile copolyester were varied as shown below in Table 1. The tear resistance of the films in both the machine and the transverse directions are reported below in Table 1 as Graves area (rounded to the nearest 10 here and for other examples) according to the procedure described more fully hereinabove. The Graves elongation at break values (rounded to the nearest 5 here and for other examples) are also reported in Table 1. The reported Graves area and Graves elongation at break values throughout the application (unless noted otherwise) are an average of 9 readings in each of the machine and transverse directions.

Although ASTM D 1004 utilizes a 0.5 inch (1.3 cm) ligament (distance "d" in FIG. 3), examples 1 to 26 herein were analyzed using a 1.31 inch (3.3 cm) ligament. For examples 1 to 26, the observed Graves area results were mathematically converted to a value corresponding to a 0.5 inch (1.3 cm) ligament by multiplying the observed result by 0.678 and adding 32.4, this conversion factor having been determined by a linear regression analysis of multiple samples. The observed results for Graves elongation at break for examples 1 to 26 were also mathematically converted so as to correspond to a 0.5 inch (1.3 cm) ligament by multiplying the observed result by 0.655 and adding 11.3, this conversion factor having been determined by a linear regression analysis of multiple samples.

TABLE 1

| Example | Number of Layers | Film Thickness (μm) | Wt. % of Ductile Material | Graves Area (kpsi %) MD | Graves Area (kpsi %) TD | Graves Elongation at Break (%) MD | Graves Elongation at Break (%) TD |
|---|---|---|---|---|---|---|---|
| 1 | 5 | 54.6 | 10 | 160 | 160 | 40 | 40 |
| 2 | 5 | 54.1 | 20 | 110 | 130 | 30 | 35 |
| 3 | 5 | 47.8 | 30 | 120 | 130 | 35 | 40 |
| 4 | 5 | 45.7 | 40 | 80 | 110 | 25 | 40 |
| 5 | 5 | 45.7 | 50 | 60 | 80 | 20 | 35 |
| 6 | 13 | 45.7 | 10 | 190 | 190 | 30 | 40 |
| 7 | 13 | 57.7 | 10 | 240 | 210 | 45 | 45 |
| 8 | 13 | 54.6 | 20 | 160 | 150 | 35 | 40 |
| 9 | 13 | 49.5 | 30 | 80 | 100 | 25 | 35 |
| 10 | 13 | 53.3 | 40 | 90 | 90 | 30 | 35 |
| 11 | 13 | 48.3 | 50 | 70 | 80 | 25 | 30 |
| 12 | 29 | 45.7 | 10 | 190 | 130 | 35 | 30 |
| 13 | 29 | 46.5 | 20 | 110 | 80 | 30 | 30 |
| 14 | 61 | 47.5 | 10 | 130 | 100 | 30 | 30 |
| 15 | 61 | 53.3 | 20 | 120 | 80 | 30 | 25 |
| 16 | 61 | 53.3 | 30 | 100 | 80 | 25 | 30 |
| 17 | 61 | 53.3 | 40 | 80 | 70 | 25 | 25 |
| 18 | 61 | 50.8 | 50 | 70 | 60 | 25 | 25 |
| 19 | 5 | 27.9 | 10 | 130 | 120 | 25 | 30 |
| 20 | 13 | 25.4 | 10 | 140 | 130 | 30 | 30 |
| 21 | 29 | 26.2 | 10 | 90 | 70 | 20 | 20 |
| 22 | 61 | 24.1 | 10 | 110 | 80 | 25 | 20 |
| 23 | 5 | 15.2 | 10 | 90 | 90 | 20 | 25 |
| 24 | 13 | 14.0 | 10 | 80 | 70 | 20 | 20 |
| 25 | 29 | 15.2 | 10 | 80 | 70 | 20 | 20 |
| 26 | 61 | 12.7 | 10 | 60 | 50 | 15 | 15 |

The data of Table 1 show that as the number of layers in the film remains constant, the Graves area of the film decreases as the amount of ductile material increases above 10%. The data of Table 1 further show that as the total number of layers increases, the tear resistance of the films tends to increase and then becomes more constant or decreases as the number of layers approaches 61, especially at lower wt. % amounts of the ductile material. Consequently, films according to the invention comprise at least 5 layers, more preferably from more than 5 layers to 35 layers, and most preferably about 13 layers.

Figure 5:
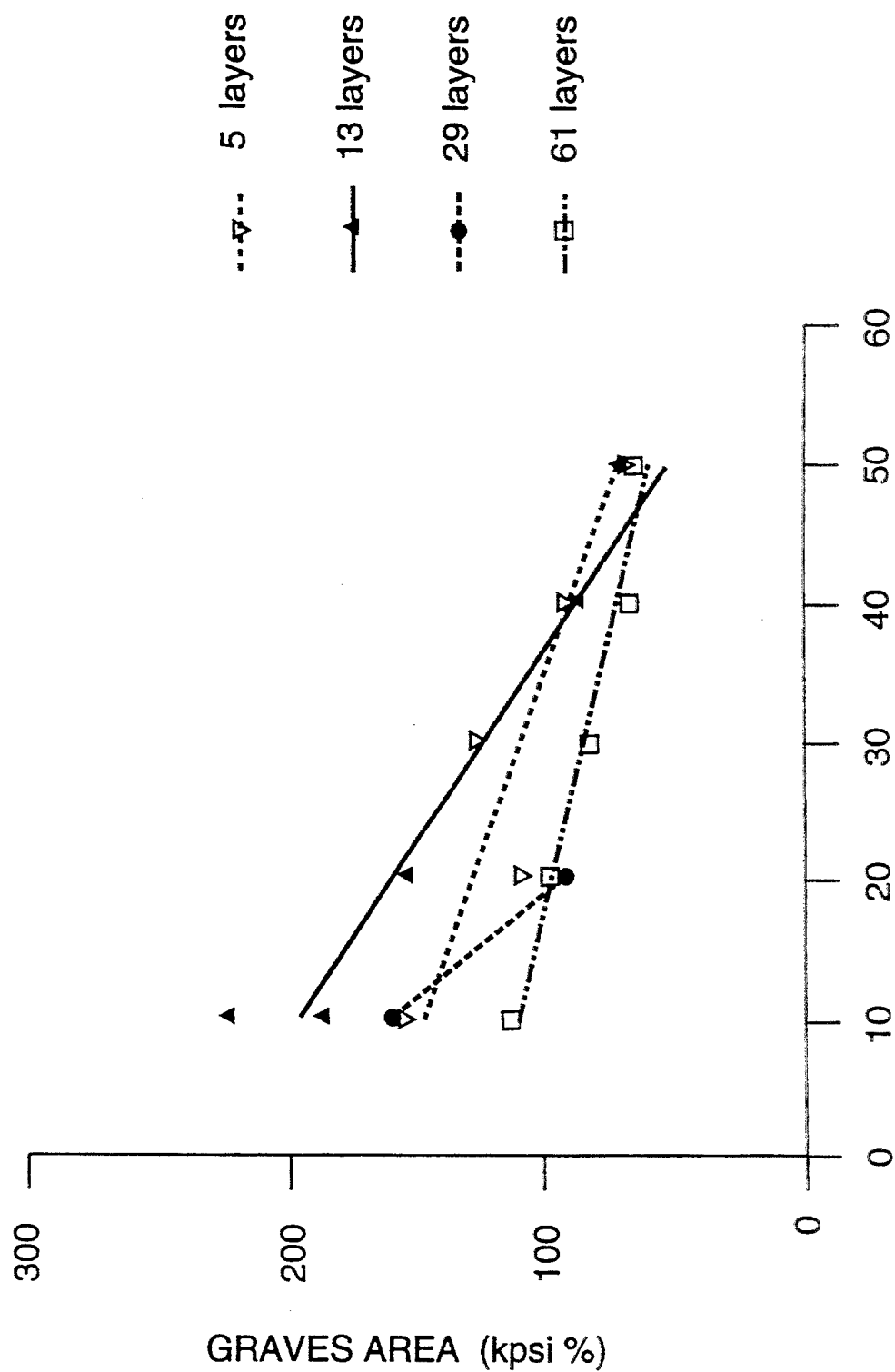
FIG. 5 is a graphical representation of Graves area vs. weight % of ductile material for several films according to the invention.

FIG. 5 is a graphical representation of the data of examples 1 to 18, the plotted Graves area being an average of the MD and TD values from Table 1. FIG. 5 illustrates the relationship among Graves area, the wt. % of the ductile material, and the number of layers in the film as the total film thickness was attempted to be held relatively constant. Using linear regression analysis, the lines which "best fit" the data sets (based on the number of layers in the film) were drawn.

However, as shown in examples 19 to 26, tear resistance is also related to film thickness and the above trends may not always be rigidly observed as film thickness decreases. Thicker multilayer films generally have enhanced tear resistance relative to thinner multilayer films when the number of layers and the amount of ductile material are essentially constant.

COMPARATIVE EXAMPLES 1 to 6

Comparative examples (C.E.) 1 to 6 report a series of single layer films formed by extruding the PET of examples 1 to 26 onto a chilled wheel. The films were sequentially drawn 3.5 to 4 times in the machine direction at about 85° to 90° C., and then about 4.5 times in the transverse direction at about 100° C. The films were subsequently heat set at 220° to 225° C. The films so produced were regarded as representative of conventional, commercially available PET films such as might be used in packaging applications. The films were tested for Graves area and Graves elongation at break in both the machine and transverse directions according to the procedures described above and with the results shown below in Table 2.

(The processing conditions in the preparation of these comparative examples were not identical to those used in preparing examples 1 to 26. It will be understood by those of ordinary skill in the art that adjustments in processing conditions can affect film properties. However, the films of comparative examples 1 to 6 are regarded as representative of conventional, commercially available PET films. Other comparative data which replicate examples herein may be found in conjunction with examples 38 and 39, for instance.)

TABLE 2

| Example | Film Thickness (μm) | Graves Area (kpsi %) | | Graves Elongation at Break (%) | |
|---|---|---|---|---|---|
| | | MD | TD | MD | TD |
| C.E. 1 | 11.9 | 40 | 30 | 5 | 10 |
| C.E. 2 | 22.4 | 60 | 40 | 10 | 10 |
| C.E. 3 | 35.0 | 40 | 50 | 10 | 15 |
| C.E. 4 | 45.5 | 40 | 50 | 15 | 10 |
| C.E. 5 | 96.3 | 70 | 70 | 15 | 20 |
| C.E. 6 | 174.0 | 90 | 80 | 20 | 20 |

Figure 6:
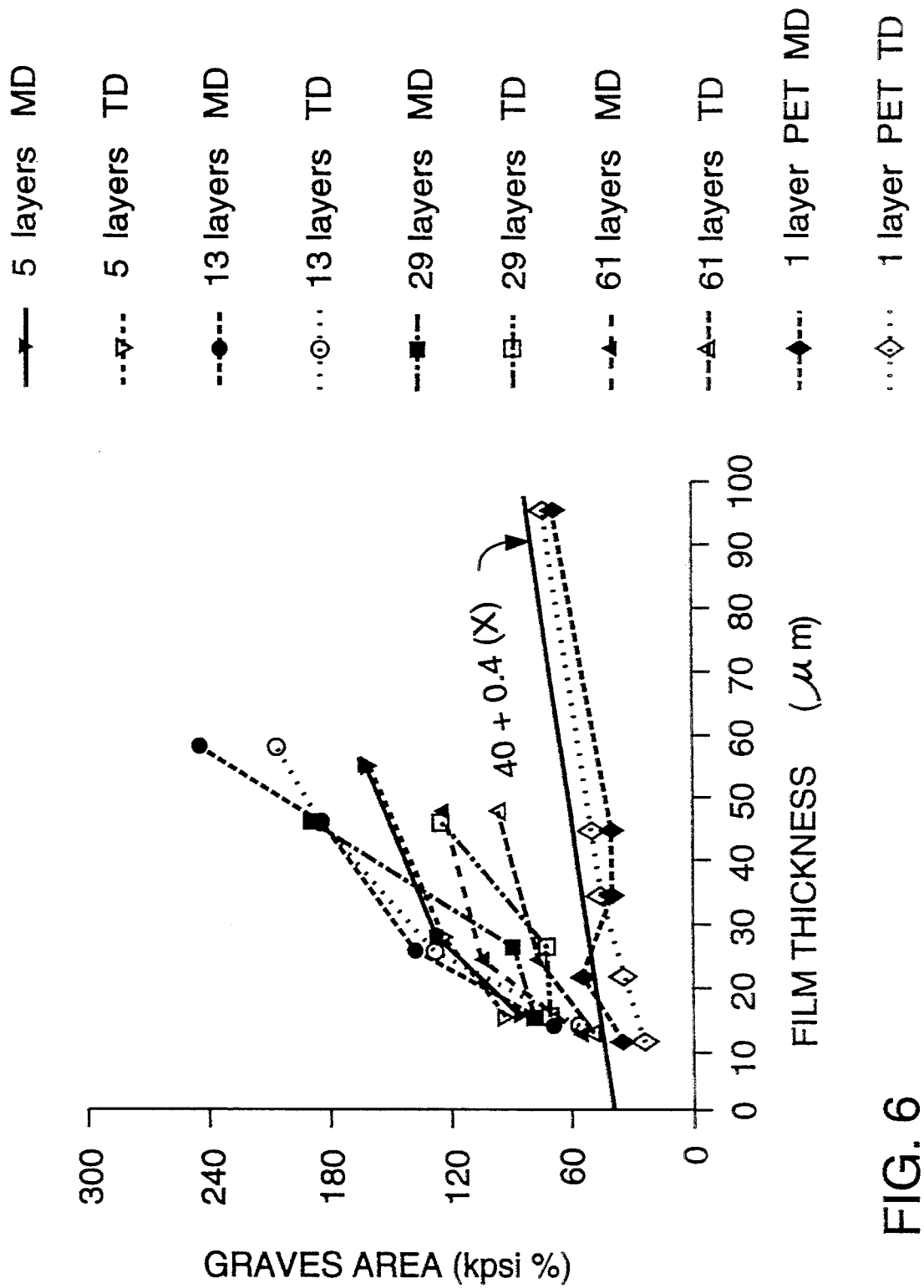
FIG. 6 is a graphical representation of Graves area vs. film thickness for several films according to the invention and several comparative films.

The data of examples 1, 6, 7, 12, 14, and to 26 were graphically plotted in FIG. 6 to illustrate the relationship among Graves area, film thickness, and the number of layers as the wt. % of the ductile material was held constant at 10%. Separate curves were then constructed for the 5, 13, 29 and 61 layer films in both the machine and transverse directions by serially connecting the data points. Separate curves were also prepared in the machine and transverse directions for the single layer PET films of comparative examples 1 to 5. (Comparative example 6 was not included in FIG. 6 in order to facilitate data management and presentation of the graph.) As shown in FIG. 6, multilayer films according to the invention, virtually without exception, demonstrated a Graves area which exceeded that observed for the conventional PET films of comparative examples 1 to 5, whether tested in the machine or the transverse direction.

Also shown in FIG. 6 is the line defined by the equation 40+0.4(x) kpsi % wherein x is the nominal thickness of the film in microns. Multilayer films according to the invention have Graves area values which fall above this line whereas the conventional PET films of comparative examples 1 to 5 have Graves area values which fall below this line. Thus preferred multilayer films comprising alternating layers of a stiff polymeric material, a ductile polymeric material, and, optionally, an intermediate material, according to the invention are considered to be tear resistant if they demonstrate a Graves area which is equal to or which exceeds 40+0.4(x) kpsi % wherein x is the nominal thickness of the film in microns. As explained above and related to their overall performance, tear resistant films of the invention also preferably exhibit a tensile modulus in one direction of the film of at least 175 kpsi (1,203 MPa), more preferably at least 240 kpsi (1,650 MPa), and most preferably at least 450 kpsi (3,105 MPa) as well as a Graves elongation at break of at least 20%, preferably at least 40%.

EXAMPLES 27 to 31

A series of films comprising a total of 13 alternating layers of the stiff material of examples 1 to 26 and a ductile material provided by ECDEL 9966 (believed to be a copolyester based on 1,4-cyclohexane dicarboxylic acid, 1,4-cyclohexane dimethanol, and polytetramethylene ether glycol) was coextruded onto a chilled quenching wheel. When tested according to the procedures described in examples 1 to 26 for the ductile copolyester, the ductile material of examples 27 to 31 was found to have a tensile modulus of 26 psi (179 MPa) and a tensile elongation of 630%. The films were subsequently simultaneously oriented 3.3 times in both the machine and transverse directions at 99° C. and heat set at 135° C. The film thickness and the relative amounts of the ductile material were varied as shown below in Table 3. The Graves area, tensile modulus, and Graves elongation at break were tested in the machine and transverse directions as described above with the results shown below in Table 3.

TABLE 3

| Example | Film Thickness (μm) | Wt. % Ductile Material | Graves Area (kpsi %) | | Tensile Modulus (kpsi) | | Graves Elongation at Break (%) | |
|---|---|---|---|---|---|---|---|---|
| | | | MD | TD | MD | TD | MD | TD |
| 27 | 46.0 | 2.6 | 340 | 230 | 560 | 610 | 35 | 30 |
| 28 | 47.5 | 4.1 | 440 | 180 | 555 | 595 | 80 | 50 |
| 29 | 49.8 | 6.9 | 320 | 240 | 550 | 570 | 65 | 65 |
| 30 | 50.8 | 9.7 | 330 | 280 | 525 | 545 | 70 | 65 |
| 31 | 52.8 | 12.2 | 270 | 300 | 590 | 545 | 65 | 70 |

The data of Table 3 show the benefit of the multilayer films of the invention including at least about 2.6 weight % of the ductile material. Acceptable Graves area and tensile modulus values were observed as the weight % varied from 2.6 to 12.2. Even when the amount of the ductile material was less than 5 wt % useful Graves area and tensile modulus values were obtained.

EXAMPLES 32 to 34

A series of films comprising 13 alternating layers of a stiff PET (DSC melting point=256° C.; intrinsic viscosity=0.72 dl/g) coextruded with a ductile ethylene/vinyl acetate copolymer having 18% vinyl acetate and a melt index of 8.0 (measured by ASTM Test Method D 1238 in all examples) was cast onto a chilled quenching wheel. The films were subsequently sequentially oriented 3.2 times at 93° C. in the machine direction and 3.5 times at 102° C. in the transverse direction followed by heat setting at 204° C. The thickness of each film was approximately 48 μm. The weight % of the ductile material was varied as shown below in Table 4 along with the Graves area and Graves elongation at break test data. The reported data are an average of 5 readings in each of the machine and transverse directions.

TABLE 4

| Example | Wt. % Ductile Material | Graves Area (kpsi %) MD | Graves Area (kpsi %) TD | Graves Elongation at Break (%) MD | Graves Elongation at Break (%) TD |
|---|---|---|---|---|---|
| 32 | 5 | 190 | 170 | 40 | 40 |
| 33 | 10 | 220 | 230 | 45 | 45 |
| 34 | 20 | 180 | 180 | 50 | 45 |

Table 4 shows the utility of using about 5 to 20 weight % of the ductile material although ductile material amounts of 10 weight % or less provide the desired effect.

EXAMPLE 35

A film comprising a total of 13 alternating layers of the stiff material of examples 32 to 34 and 20 weight % of a ductile ethylene/vinyl acetate copolymer having 25% vinyl acetate and a melt index of 19 was coextruded and processed as described in conjunction with examples 32 to 34 with the exception that the film thickness was 42 μm. The film of this example had a Graves area of 160 kpsi % in the machine direction and 190 kpsi % in the transverse direction, and a Graves elongation at break of 35% in the machine direction and 40% in the transverse direction, the reported data being an average of 5 measurements in each direction.

EXAMPLE 36

A 13 layer film according to example 35 was produced with the exception that the ductile material was an ethylene/vinyl acetate copolymer having 9% vinyl acetate and a melt index of 7 and the film thickness was 50 μm. The film of this example demonstrated a Graves area of 190 kpsi % in the machine direction and 200 kpsi % in the transverse direction, and a Graves elongation at break of 50% in each of the machine and transverse directions, the reported data being an average of 5 measurements in each direction.

EXAMPLE 37

An approximately 50 μm thick 13 layer film was produced according to the procedure of examples 32 to 36 except using the stiff PET of examples 1 to 26 and 10 weight % of a ductile ethylene/vinyl acetate copolymer having 18% vinyl acetate and a melt index of 8. The film of this example had a Graves area of 220 kpsi % in the machine direction and 240 kpsi % in the transverse direction, and a Graves elongation of 45% in each of the machine and transverse directions, the reported data being an average of 5 measurements in each direction.

EXAMPLE 38

A 13 μm thick multilayer film was produced comprising a total of 13 alternating layers of a stiff PET (DSC melting point = 256° C., intrinsic viscosity = 1.04) coextruded with a ductile segmented block copolymer comprising nylon 12 and polytetramethylene glycol (68% by weight nylon block). The film comprised 90 wt. % of the stiff material and 10 wt. % of the ductile material. The film was extruded onto a chilled casting wheel, simultaneously biaxially oriented at 110° C. 4.5 times in each of the machine and transverse directions, and heat set at 150° C. The film exhibited a Graves area of 70 kpsi % in each of the machine and transverse directions as well as a tensile modulus of 635 kpsi in each of the machine and transverse directions, which represent an average of 5 measurements in each direction. A similar film produced in the same manner but having 90% by weight of the nylon block in the ductile copolymer exhibited a Graves area of 10 kpsi % (13 kpsi % observed) in each of the machine and transverse directions as well as a tensile modulus of 685 kpsi in each direction (average of 5 measurements).

When a single layer film comprising only the stiff PET was extruded, biaxially drawn and heat set in the same manner and at a thickness of 13 μm, it demonstrated an average Graves area of 6 kpsi %, a tensile modulus of 795 kpsi, and a Graves elongation at break of 2.5% in the machine and transverse directions. Compared to the relatively thicker films of some of the preceding examples, the films of example 38 had a reduced Graves area. However, as compared to the single layer PET film, even the relatively thin films of this example demonstrated an improved Graves area. In particular, the second multilayer film, while not satisfying the Graves area equation which describes the preferred films of the invention, had a Graves area of about double that of the single layer PET film.

EXAMPLE 39

A film comprising a total of 13 alternating layers of the stiff PET of examples 1 to 26 coextruded with 5 weight % of the ductile material of the same examples was prepared. The film was cast onto a chilled quenching wheel, sequentially oriented 2.6 times in the machine direction at 86° C. and 4.5 times in the transverse direction at 103° C., and heat set at 149° C. The film was about 62 μm thick and displayed a Graves area of 330 kpsi % in the machine direction and 220 kpsi % in the transverse direction. The film also exhibited a tensile modulus of 500 kpsi in the machine direction and 700 kpsi in the transverse direction, and a Graves elongation at break of 45% in each direction. The multilayer film of this example was used to prepare curve C of FIG. 4.

When a single layer film comprising only the stiff PET of this example was extruded, biaxially drawn and heat set in the same manner at a thickness of about 66 μm, it demonstrated a Graves area of 120 kpsi % in the machine direction and 80 kpsi % in the transverse direction. The single layer film also displayed a tensile modulus of 530 kpsi in the machine direction and 730 kpsi in the transverse direction. (Data reported for the single layer PET film are an average of 5 measurements in each direction.) Even though the tensile moduli of the multilayer and single layer films were comparable, the multilayer film demonstrated superior tear resistance as measured by the Graves area test.

EXAMPLE 40

A film having a total of 13 alternating layers of a stiff copolyester comprising 85 mole % terephthalic acid and 15 mole % sebacic acid as the dicarboxylic acid components and 100 mole % ethylene glycol as the diol component, and 10 weight % of a ductile polyurethane (ESTANE 58277), was coextruded onto a chilled quenching wheel, simultaneously oriented 3.5 times in each of the machine and transverse directions at 100° C., and heat set at 149° C. The film had a thickness of about 69 μm and displayed a Graves area of 160 kpsi % in the machine direction and 190 kpsi % in the transverse direction. The film further exhibited a tensile modulus of 180 kpsi in the machine direction and 190 kpsi in the transverse direction. The film also demonstrated a Graves elongation at break of 45% in each of the machine and transverse directions. The data are an average of 5 measurements in each of the machine and transverse directions.

EXAMPLE 41

A multilayer film comprising three different materials coextruded in the configuration S(IDIS)y and having a total of 45 layers (y=11) was prepared. The "S" (stiff) material was the stiff PET of examples 1 to 26, the "I" (intermediate) material was an ethylene/vinyl acetate copolymer tie layer having 18% vinyl acetate and a melt index of 8, and the "D" (ductile) material was a ductile, low density (0.916 grams per cubic centimeter) polyethylene having a melt index of 3.5. The stiff material provided 90 weight %, of the film, the intermediate material provided 4 weight %, and the ductile material provided 6 weight %. The film was extruded onto a chilled casting wheel and biaxially oriented 3.2 times in each of the machine and transverse directions at 100° C. and heat set at 204° C. The 61 μm thick film exhibited a Graves area of 70 kpsi % in the machine direction and 100 kpsi % in the transverse direction as well as a Graves elongation at break of 25% in the machine direction and 30% in the transverse direction.

COMPARATIVE EXAMPLES 7 to 10

A series of three layer films was prepared by coextruding the ductile material of examples 27 to 31 with two layers of the stiff PET of examples 1 to 26, the PET providing the two outer layers. The films were extruded onto a chilled casting wheel, simultaneously biaxially drawn at 99° C., and heat set at 149° C. The films of comparative examples 7 and 8 were biaxially drawn 3.3 times in each of the machine and transverse directions. The films of comparative examples 9 and 10 were biaxially drawn 4.0 times in each of the machine and transverse directions. Film thickness and the wt. % of the ductile material were varied as shown below in Table 5. Table 5 also reports the Graves area for each film. Also repeated is example 30 which utilizes the same stiff and ductile polymers as comparative examples 7 to 10 except in a 13 layer arrangement. The film processing conditions were the same as for comparative examples 7 and 8 except that the film was heat set at 135° C., a difference which is not believed to have significantly affected the results.

TABLE 5

| Example | Film Thickness (μm) | Wt. % of Ductile Material | Graves Area (kpsi %) | |
|---|---|---|---|---|
| | | | MD | TD |
| C.E. 7 | 45.7 | 10 | 200 | 180 |
| C.E. 8 | 29.5 | 35 | 130 | 150 |
| C.E. 9 | 35.6 | 10 | 220 | 180 |
| C.E. 10 | 34.3 | 35 | 110 | 120 |
| 30 | 50.8 | 9.7 | 330 | 280 |

Table 5 shows that example 30 as compared to comparative example 7 had an increased Graves area. Although, the 3 layer films of comparative examples 7 to 10 did not tear immediately (i.e., they elongated by about 10%), some samples failed catastrophically (i.e., they had a Graves elongation at break of less than 10%). The film of example 30, on the other hand, experienced fewer catastrophic failures. Hence, the film of example 30 was regarded as better than the films of comparative examples 7 to 10.

COMPARATIVE EXAMPLES 11 to 14

A series of comparative examples was prepared by extruding the stiff and ductile materials of examples 1 to 26 into a blended single layer film rather than a multilayer film. The single layer films were extruded onto a chilled casting wheel, biaxially oriented 3.3 times in each of the machine and transverse directions at 100° C., and heat set at 140° C. The weight % of the ductile material was varied as shown below in Table 6 along with the results of the Graves area and Graves elongation at break tests, the reported data being an average of 5 measurements in each direction. The films were not sufficiently uniformly thick to permit Graves area, tensile modulus and Graves elongation at break testing at one thickness in both the machine and transverse directions. Consequently, Table 6 also reports the film thickness for testing in each direction, the reported thickness being an average of 5 measurements in each direction.

TABLE 6

| Example | Wt. % of Ductile Material | Film Thickness (μm) | | Tensile Modulus (kpsi) | | Graves Area (kpsi %) | | Graves Elongation at Break (%) | |
|---|---|---|---|---|---|---|---|---|---|
| | | MD | TD | MD | TD | MD | TD | MD | TD |
| C.E. 11 | 0 | 33 | 39 | 640 | 640 | 70 | 100 | 20 | 30 |
| C.E. 12 | 5 | 43 | 25 | 420 | 450 | 80 | 110 | 30 | 35 |
| C.E. 13 | 10 | 27 | 38 | 440 | 570 | 80 | 80 | 30 | 25 |
| C.E. 14 | 30 | 80 | 59 | 410 | 420 | 80 | 110 | 30 | 35 |

Comparative examples 11 to 14 illustrate that blends of stiff and ductile materials extruded as single layer films do not exhibit any significant improvement in tear resistance with the addition of a ductile material. This is in distinction to the benefits which are achieved by coextruding the stiff and ductile materials into a multilayer film according to the invention.

COMPARATIVE EXAMPLE 15

Comparative example 15 describes the preparation of the single layer PET film measured by curve A of FIG. 4. More specifically, the PET of examples 1 to 26 was melt extruded onto a chilled casting wheel and then sequentially oriented 3.4 times in the machine direction at 88° C. and 4.0 times in the transverse direction at 110° C., followed by heat setting at 232° C. The finished film was 51 μm thick and demonstrated a Graves area of 30 kpsi % in the machine direction and 40 kpsi % in the transverse direction as well as a tensile modulus of 660 kpsi in the machine direction and 650 kpsi in the transverse direction. The film exhibited a Graves elongation at break of 10% in each direction. The film of this example is considered representative of a conventional biaxially oriented PET film.

COMPARATIVE EXAMPLE 16

Comparative example 16 describes the preparation of the single layer linear low density polyethylene film measured by curve B of FIG. 4. More specifically, TF0119F linear low density polyethylene (hexene co-monomer) having a density of 0.918 grams/cubic centimeter and commercially available from Novacor Chemicals, Inc. (Calgary, Alberta) was extruded and blown into a 51 μm thick film. The blow up ratio was 3.2 and the draw down ratio was 12.3. The film demonstrated a Graves area of 180 kpsi % in the machine direction and 200 kpsi % in the transverse direction due significantly to the large Graves elongation at break (greater than 180%). However, the film exhibited a relatively low stress. The film of this example is considered representative of films conventionally employed in the manufacture of garbage and grocery bags.

EXAMPLES 42 to 45

COMPARATIVE EXAMPLES 17 and 18

A series of examples was prepared to illustrate the improvement in tear resistance that is possible when multilayer films comprising alternating layers of stiff and ductile materials are oriented in only one direction. More specifically, a series of 13 layer films having the composition of the film of example 39 (the PET of examples 1 to 26 with 5 wt. % of the ductile material of the same examples) was extruded onto a chilled casting wheel. A square sample of each film was clamped on all four sides and drawn at 100° C. 4.0 times in one direction at a constant width while being restrained in the transverse direction. The film was then heat set at 150° C. The tear resistance of the film and the Graves elongation in the direction of orientation (MD) and the direction perpendicular thereto (TD) were tested as described above with the results shown below in Table 7. Also evaluated and reported in Table 7 as comparative examples 17 and 18 are two single layer films comprising the PET of example 39 processed as described for examples 42 to 45.

TABLE 7

| Example | Film Thickness (μm) | Graves Area (kpsi %) | | Graves Elongation at Break (%) | |
|---|---|---|---|---|---|
| | | MD | TD | MD | TD |
| 42 | 89 | 80 | NT | 30 | NT |
| 43 | 117 | 40 | 540 | 50 | 105 |
| 44 | 131 | 20 | 540 | 10 | 110 |
| 45 | 252 | 60 | 440 | 25 | 110 |
| C.E. 17 | 90 | 10 | NT | 5 | NT |
| C.E. 18 | 120 | 10 | 400 | 10 | 90 |

NT Not tested

These examples show that uniaxially oriented multilayer films according to the invention can offer improved tear resistance relative to single layer films comprising only a stiff PET.

EXAMPLES 46 to 49

Four 13 layer uniaxially oriented films were prepared according to the procedure described in conjunction with examples 42 to 45 except that the films were drawn either 3.5 times or 4.0 times (as reported below in Table 8) and the film composition was different. The films comprised the stiff PET of examples 27 to 31 coextruded with 5 wt. % of the ductile material of the same examples (ECDEL 9966). The tear resistance and Graves elongation at break of the films were tested as described above with the results shown below in Table 8.

TABLE 8

| Example | Film Thickness (μm) | Draw Ratio | Graves Area (kpsi %) | | Graves Elongation at Break (%) | |
|---|---|---|---|---|---|---|
| | | | MD | TD | MD | TD |
| 46 | 160 | 3.5 | 100 | NT | 40 | NT |
| 47 | 180 | 3.5 | NT | 420 | NT | 100 |
| 48 | 138 | 4.0 | 70 | NT | 30 | NT |
| 49 | 150 | 4.0 | N | 450 | NT | 100 |

NT = Not tested

Examples 46 to 49 were not tested for Graves area and Graves elongation at break in both the machine and transverse directions as insufficient material existed for preparing appropriate samples for testing in both directions. While examples 46 and 48 do not satisfy the equation for tear resistance provided above for preferred films when tested in the machine direction, it is believed that such samples would meet this equation when tested in the transverse direction as evidenced by the transverse direction Graves area data obtained for examples 47 and 49. Furthermore, and although there is a difference in thickness among examples 46 and 48 and comparative examples 17 and 18 (see Table 7), the significant improvement in the machine direction tear resistance of examples 46 and 48 versus the comparative examples is believed to be representative of the benefits which can be realized by uniaxially orienting a multilayer film according to the invention as compared to a single layer PET film.

As noted above, the combination of tear resistance and high modulus provides the multilayer films of the present invention with a unique ability to absorb energy, especially in the event of a catastrophic impact. Consequently, the multilayer films disclosed herein are useful as security control laminates for shatter-proofing glazing members against impact or explosion. In such applications, one or more tear resistant multilayer films are applied to a glazing member as a shield that prevents the fragmentation of the glazing member even though it splinters or shatters upon breaking. When adhesively bonded to a glazing member, security control laminates based on the multilayer films of the present invention provide excellent energy absorption and distribution properties without significantly delaminating from the glazing member. The security control laminates are also less likely to puncture and/or tear.

Figure 7:
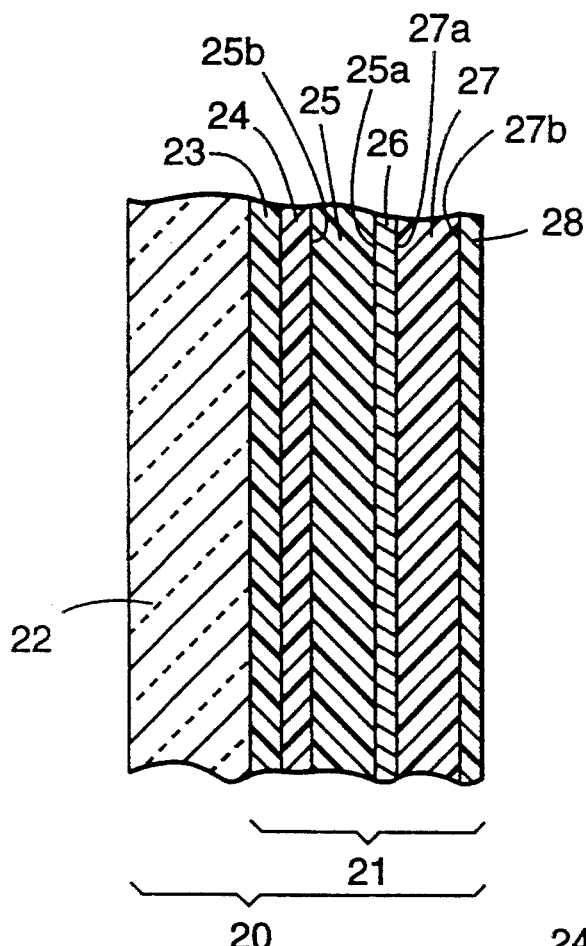
FIG. 7 is an enlarged, vertical sectional view of a glazing unit according to the invention which includes a security control laminate bonded to a glazing member, the laminate comprising two multilayer tear resistant films according to the invention.

Turning now to FIG. 7, a glazing unit 20 comprises a security control laminate 21 bonded to the interior face of a glazing member 22 by means of an adhesive layer 23, such as those commonly used for solar control or security films, including acrylate pressure-sensitive adhesives and water activated adhesives. Security control laminate 21 comprises a first multilayer film 25 (having a first face 25a and an opposed second face 25b) and a second multilayer film 27 (having a first face 27a and an opposite second face 27b) the two films being secured or bonded together by a layer of a (polyester) laminating adhesive 26.

In order to minimize the deteriorative effects of ultraviolet (UV) radiation on any of the polymeric materials which comprise the security control laminate, it is highly desirable to interpose a coating 24, containing a UV absorber, between multilayer film face 25b and adhesive layer 23. Alternatively, means for absorbing UV radiation may be incorporated into adhesive layer 23 or multilayer film 25. Suitable UV absorbent coatings may include substituted benzophenones and substituted benzotriazenes.

Multilayer film face 27b optionally includes a thin, abrasion resistant coating 28 thereon to protect film 27 from mechanical abrasion such as might occur during installation or cleaning of the security control laminate. Suitable abrasion resistant coatings comprise photopolymerized materials such as the "hydantoin hexacrylate" coatings described in U.S. Pat. No. 4,249,011 (Wendling), which is incorporated herein by reference, or other photopolymerizable multifunctional acrylates.

Although FIG. 7 illustrates the security control laminate on the interior face of the glazing member (i.e., the face of the member which is opposite to the face first exposed to the force of the impact), the laminate may also be secured to the exterior face. Also contemplated is a glazing unit comprising multiple glazing members arranged in, for example, a sandwich or an insulated construction wherein the security control laminate is secured to a face of a glazing member which is interior to the sandwich or insulated construction. Additionally, it is contemplated that the security control laminate may be adhesively or mechanically attached to a supplemental frame or batten system that surrounds the glazing member as well as to the glazing member itself. An installation of this type provides additional security against unintended removal or dislodgement of the glazing member from its frame which would otherwise allow access through the glazing unit.

Figure 8:
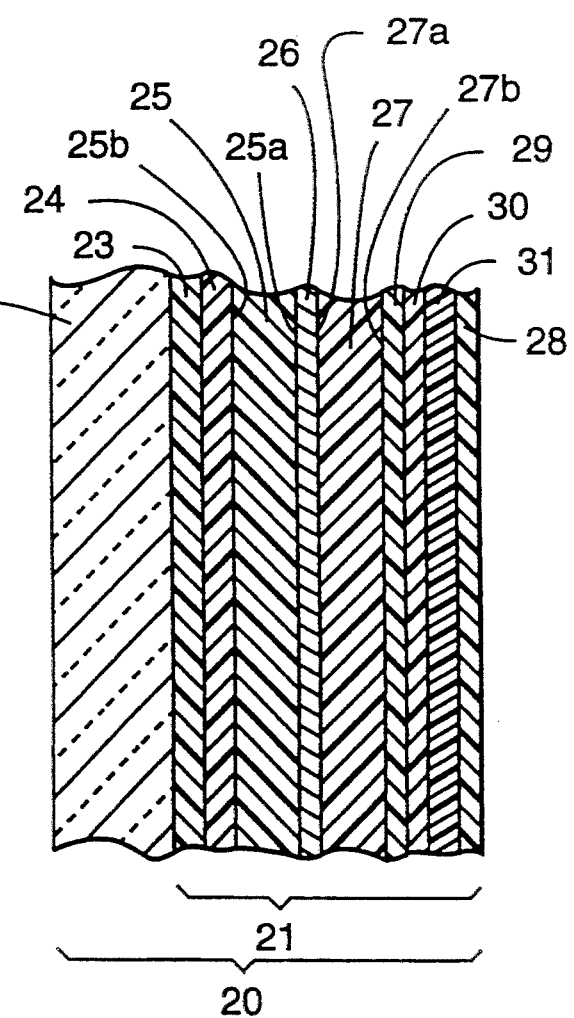
FIG. 8 is an enlarged, vertical sectional view of a second embodiment of a glazing unit according to the invention and similar to FIG. 7 but further including a metalized layer.

FIG. 8 illustrates a second embodiment of security control laminate 21 which additionally includes a reflective metalized layer 30 to impart energy control properties to the glazing unit. This embodiment is similar to the security control laminate illustrated in FIG. 7 except that metalized layer 30 is adjacent to multilayer film face 27b rather than abrasion resistant coating 28.

More particularly, a carrier film 31 supports metalized layer 30, the latter being bonded to multilayer film face 27b by an adhesive layer 29. Metalized layer 30 may be aluminum, gold, silver, copper, nickel, or any other suitable reflector of radiant energy over the solar and infrared spectrum (i.e., a wavelength of 0.3 to 40 μm). Metalized layer 30 may be applied to carrier film 31 by, for example, vapor deposition. Preferably, metalized layer 30 is relatively transparent to visible light and offers good reflectivity of infrared radiation. Carrier film 31 comprises an optically clear film, preferably an optically clear polyester film, having a thickness in the range of about 13 to 51 μm (0.5 to 2.0 mils). Optionally, carrier film 31 may be dyed to provide additional protection from radiation incident on the glazing unit. In this regard, any optical grade dyed film may be used. Such films typically comprise an optically clear polyester film which has been dipped in a heated solvent bath containing a dye of the desired (and often customized) color, washed, rinsed and dried. Films of this type are commercially available from Martin Processing Company (Martinsville, Va.). Adhesive layer 29 may be a laminating adhesive similar to adhesive layer 26 for example. The embodiment of FIG. 8 may (but need not) include abrasion resistant coating 28 on the face of carrier film 31 which does not support metalized layer 30.

Figure 9:
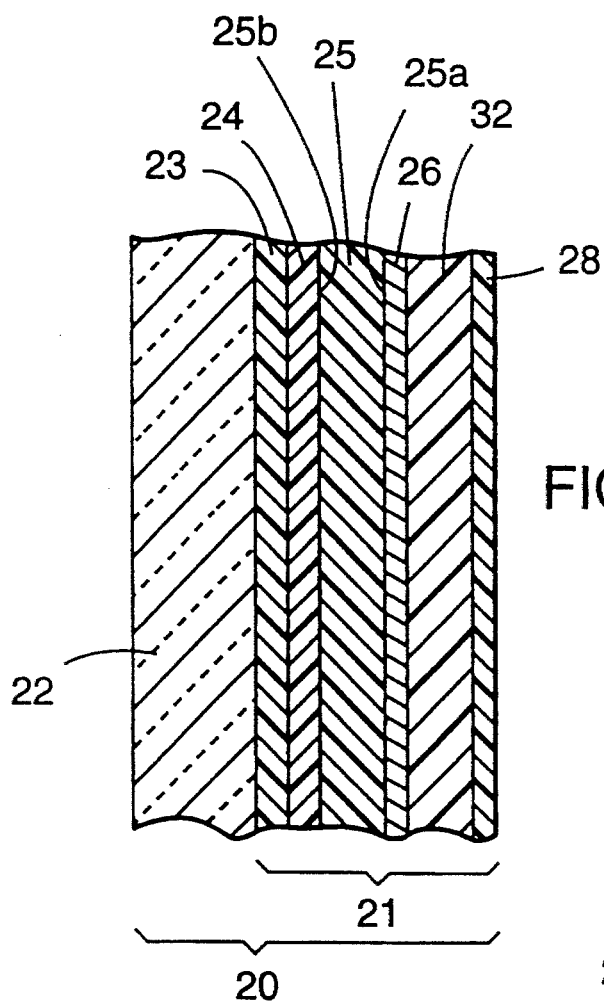
FIG. 9 is an enlarged, vertical sectional view of a third embodiment of a glazing unit according to the invention and similar to FIG. 7 but utilizing a single multilayer tear resistant film according to the invention.

FIG. 9 illustrates a third embodiment of security control laminate 21 which utilizes a single multilayer film 25. The embodiment of FIG. 9 is similar to those described in conjunction with FIGS. 7 and 8 with the exception that multilayer film 27 has been replaced by a dyed film 32 that is secured to multilayer film face 25a by way of adhesive layer 26. Abrasion resistant coating 28 protects the opposite face of dyed film 32 from mechanical abrasion. Dyed film 32 is similar to the dyed version of carrier film 31 described in conjunction with FIG. 8.

Constructions other than those illustrated above comprising different arrangements of multilayer films, metalized films, and/or dyed films are also possible. Such other constructions may offer various security and/or solar control properties as will be appreciated by the skilled artisan. Furthermore, while certain coatings and layers may be described herein as being "on" other coatings and layers of the security control laminate, it will be understood that this encompasses both direct and indirect attachment to the other coatings or layers.

Figure 10:
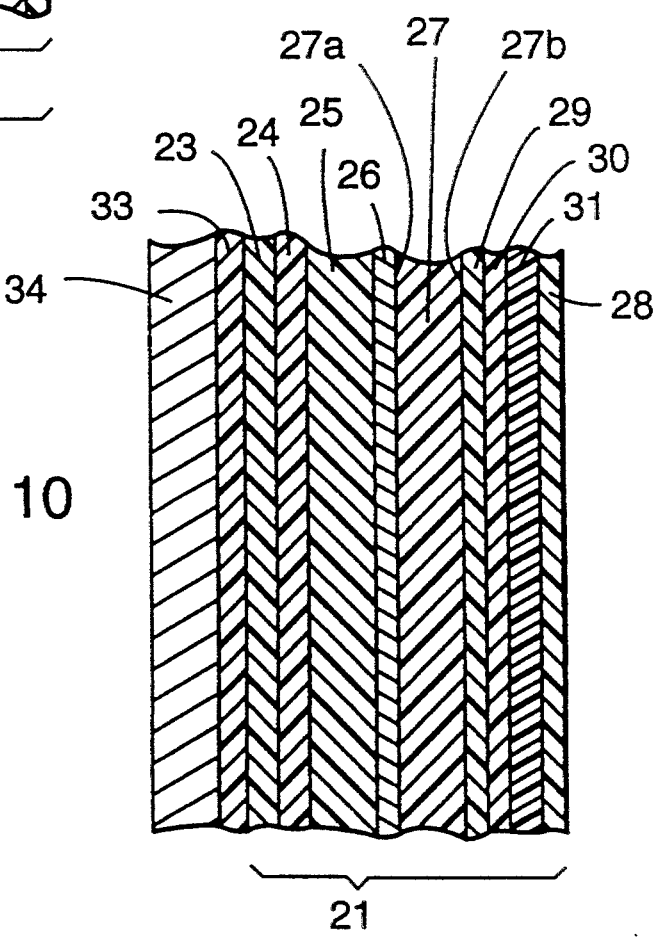
FIG. 10 is an enlarged, vertical sectional view of a security control laminate similar to that illustrated in FIG. 8 but secured to a removable release liner.

FIG. 10 illustrates the security control laminate of FIG. 8 before installation on a glazing member. Overcoat 33, which preferably is a water soluble material, is applied over adhesive layer 23 to protect it from damage during manufacture and handling. A variety of water soluble materials such as methyl cellulose or polyvinyl alcohol are suitable as the overcoat material. Security control laminate 21 is temporarily disposed on a removable release liner 34 which is discarded prior to installation of the laminate on the glazing member. Release liners typically employed with solar control and security films may be used. The security control laminate is prepared for application by removing the release liner and rinsing the laminate with water to remove overcoat 33, thereby exposing and/or activating adhesive layer 23. Security control laminate 21 is then applied to the glazing member using conventional installation techniques known in the art.

The following examples illustrate the particular utility of multilayer films according to the invention in providing security control laminates for glazing members. In these examples all parts and percentages are by weight and all film and layer thicknesses are nominal thicknesses. Single pane window glass panels having a security control laminate according to the invention applied to one face thereof were tested for their ability to withstand impact without puncture and/or tearing in accordance with a modified version of American National Standards Institute's Specification for Safety Glazing Material Used in Buildings, ANSI Z97.1-1984. In general, tests were conducted by swinging a weighted shotbag into 0.3 cm and/or 0.6 cm thick glass panels in a pendulum arc, dropping the bag from heights of 45.7 cm (18 inches) and 122 cm (48 inches). (The shotbag impacted the surface of the glass panel which did not have the security control laminate bonded thereto.) The heights used will be recognized as corresponding to levels II and III of ANSI Z97.1-1984. The ANSI test setup was utilized but different numbers of panels were tested at less than all of the levels specified in the published procedure. An individual panel was considered to have met the test requirements, if, after impact, a 7.6 cm diameter metal ball mounted on a rod could not be passed through any break in the panel resulting from the impact.

EXAMPLE 50

A multilayer film comprising 13 alternating layers of the stiff PET of examples 1 to 26 and the ductile copolyester of the same examples was coextruded onto a chilled casting wheel and subsequently sequentially oriented 2.6 times in the machine direction at about 85° C. to 90° C. and 3.3 times in the transverse direction at 99° C. The resulting 58 μm thick film was heat set at 149° C. and comprised 7 wt. % of the ductile material.

One surface of the multilayer film was corona treated to a surface energy of 40 to 44 dynes/cm under standard corona treating conditions using an apparatus available from Enercon Industries.

Adhesive was applied to the corona treated surface of the multilayer film by coating a 14.5% solids solution of a pressure sensitive adhesive comprising 100 parts of a 96:4 isooctyl acrylate:acrylamide copolymer (prepared as described in U.S. Pat. No. Re. 24,906 to Ulrich, which is incorporated herein by reference), 2 parts of a UV absorber (UNIVUL D-50, commercially available from BASF), 0.8 part of a fluorochemical surfactant (FC740, commercially available from Minnesota Mining and Manufacturing Company), and 0.5 part of a substituted phenolic thioether antioxidant (SANTINOX-R, commercially available from Monsanto Company) in a solvent system comprising 33 parts heptane, 32 parts ethyl acetate, 29.5 parts toluene, and 6 parts methyl ethyl ketone. The coated multilayer film was then dried in a circulating air oven operating at 105° C. for approximately 3 minutes to remove the solvent and to provide a pressure sensitive adhesive having a dry coating weight of 22.6 grams/square meter (g/m$^2$). A 1.6% solids overcoat solution of METHOCEL A15LV (commercially available from Dow Chemical Co.) was applied over the pressure-sensitive adhesive and the water was evaporated by passing the coated film through a circulating air oven operating at 63° C. for approximately 1 minute to provide a tack-free, water soluble coating of 0.3 g/m$^2$ dry weight.

A 25 μm thick release liner comprising a release agent coated PET film was removably laminated to the METHOCEL coating by passing the construction through a pair of squeeze rolls to provide a security control laminate according the invention.

The release liner was removed, the film laminate was rinsed with water to remove the METHOCEL coating, and the security control laminate was applied to both 0.3 cm thick and 0.6 cm thick clean glass panels measuring 86.4 cm by 193 cm using standard installation techniques for solar and security films. The resulting panels were dried at room temperature for six weeks before impact testing as previously described. Six panels (3 having a thickness of 0.3 cm and 3 having a thickness of 0.6 cm) were tested at a drop height of 45.7 cm. All 6 panels met the test requirements. When 4 panels (2 of each thickness) were tested at the 122 cm drop height, none met the test requirements.

EXAMPLES 51 to 53

A series of security control laminates, each comprising two identical multilayer tear resistant films according to the invention, was prepared. Each multilayer film was 51 μm thick and comprised 13 alternating layers of the stiff PET of examples 1 to 26 and 5.6 wt. % of the ductile polymeric material of the same examples. The films were coextruded onto a chilled casting wheel and were simultaneously biaxially oriented 3.3 times in each of the machine and transverse direction at 99° C. The multilayer films of examples 51 to 53 differed only in the temperature at which they were heat set. The film of example 51 was heat set at 149° C., the film of example 52 was heat set at 163° C., and the heat set temperature for the film of example 53 was 178° C. A toluene/methyl ethyl ketone (T/MEK) solution (3.7:1 weight to weight ratio) of a tack free, polyester laminating adhesive was prepared by combining 6% VITEL PE-307 (commercially available from Goodyear Chemicals) and 0.3% MONDUR CB-75 (a curing agent available from Mobay Chemical Company). The solution was coated onto one of the multilayer films for each example and the coated films were dried in a circulating air oven operating at 63° C. for approximately 2 minutes to provide dry adhesive coatings of approximately 0.8 g/m$^2$.

The second multilayer film for each example was laminated to the adhesive coated surface of the first multilayer film by passing the layered structures through a pair of squeeze rollers operating at 75° C. and 207 dynes/cm$^2$ (30 psi). The dual film laminates were then corona treated, coated with a pressure sensitive adhesive and overcoat, and provided with a removable release liner, all as described more fully in example 50.

The panels were prepared and tested for impact resistance as described above using 0.6 cm thick glass panels and a 122 cm drop height. In example 51, 8 of the 10 panels tested met the test requirements, while 5 of the 10 panels did for example 52, and 4 of the 10 panels did for example 53. Thus, examples 51 to 53 suggest that the performance of security control laminates according to the invention can be varied by appropriate selection of the temperature at which the multilayer film is heat set. For use in security control laminates, the multilayer films of the invention are preferably heat set at about 145° C. to 165° C., more preferably about 149° C.

COMPARATIVE EXAMPLE 19

Comparative example 19 was a 102 μm thick commercially available security control film that comprised a pair of 51 μm thick biaxially oriented single layer PET films laminated together. Essentially, the security control laminate of example 19 was like that of example 51 except that it employed single layer PET films rather than the multilayer films of the invention. Comparative example 19 was tested according to the procedure of example 50. 6 panels (3 of each thickness) evaluated at the 45.7 cm drop height met the test requirements. One panel (0.3 cm thick glass) was tested at 122 cm and met the test requirements.

EXAMPLE 54

A security control laminate is prepared according to the procedure described in examples 51 to 53 with the exception that each multilayer film comprises 13 alternating layers of the stiff PET of example 27 to 31 and 10 wt. % of the ductile material of the same examples. The film is coextruded onto a chilled casting wheel, sequentially biaxially oriented 3.3 times in the machine direction at 99° C. and 3.4 times in the transverse direction at 99° C., and heat set at 149° C.

EXAMPLE 55

The tack free, polyester laminating adhesive of examples 51 to 53 is coated onto the multilayer film of example 51 and the coated film is dried in a circulating air oven operating 63° C. for approximately 2 minutes to produce a dry adhesive coating of approximately 0.8 g/m$^2$. A second multilayer film of the same example is laminated to the adhesive coated surface of the first multilayer film by passing the layered structure through a pair of squeeze rollers operating at 75° C. and 207 dynes/cm$^2$ (30 psi) to provide a dual film laminate.

A 25 μm thick biaxially oriented PET carrier film is vapor coated with aluminum to a sheet resistance of approximately 9 ohms/square using standard vapor coating techniques. The visible spectrum transmission of the aluminum coated film is approximately 18% at a wavelength of 0.55 μm. The tack free polyester laminating adhesive of example 51 is then coated onto the aluminum surface of the PET carrier film and dried to provide a dry adhesive coating of approximately 0.8 g/m². The resulting adhesive coated PET carrier film is then laminated to the uncoated surface of the dual film laminate by passing the layered structure through a pair of squeeze rollers operating at 75° C. and 207 dynes/cm² (30 psi).

The exposed surface of the carrier film is corona treated as described in example 50 and a solution consisting of 100 parts hydantoin hexacrylate (HHA), 4 parts IRGACURE 184 (a photoinitiator commercially available from Ciba-Geigy Corporation), and 418 parts MEK is immediately coated onto the corona treated surface. The coated construction is then passed through a circulating air oven operating at 49° C. for approximately 3 minutes to provide an HHA coating of approximately 2.7 g/m². The HHA coating is then cured by passing the construction under three banks of 200 watts/inch medium pressure mercury vapor UV lamps at a line speed of 30.5 meters/minute (100 feet/minute) and a lamp to film distance of 12 cm to provide an abrasion resistant coating.

A UV absorbent composition is prepared by combining 7.5 parts of a substituted benzophenone (e.g., UVINUL M-493 or UVINUL D-50, commercially available from BASF), 92.5 parts VITEL PE-222 (a PET terpolymer commercially available from Goodyear Chemicals), and a sufficient volume of a 1:1 weight to weight ratio T/MEK solvent system to produce a 26% solids solution.

The uncoated surface of the multilayer film laminate is corona treated to a surface energy of 40 to 44 dynes/cm (using an apparatus available from Enercon Industries) and the above described UV absorbing composition is immediately coated onto the corona treated surface. The coated laminate is then passed through a circulating air oven operating at 65° C. for approximately 2 minutes to provide a UV absorbent layer having a dry coating weight of 5.4 g/m². A pressure sensitive adhesive layer is coated over the UV absorbing composition according to example 50 (where it was applied directly to the corona treated surface) to a dry coating weight of 22.6 g/m². The adhesive layer is then overcoated with a tack-free, water activatable METHOCEL layer. A 25 μm thick release liner (such as used in example 50) is removably laminated to the METHOCEL coating by passing them through a pair of squeeze rolls.

EXAMPLE 56

Example 56 is similar to example 55 except that the aluminum vapor coated PET carrier film is replaced with a dyed PET film such as an optically clear dyed film commercially available from Martin Processing Company (Martinsville, Va.) that is laminated to the dual film construction.

Reasonable variations and modifications are possible within the scope of the foregoing specification and drawings without departing from the invention which is defined in the accompanying claims.

The embodiments for which an exclusive property or privilege is claimed are defined as follows:

1. A security control laminate comprising a first tear resistant film having a first face and a second face opposite the first face and a first layer of adhesive on the first face of the tear resistant film for bonding the security control laminate to a surface, the first tear resistant film comprising a total of more than five stiff and ductile layers situated one on the other in a parallel array, the layers occurring essentially randomly in the array, wherein (a) at least two of the layers are a stiff polyester or copolyester that has a tensile modulus greater than 200 kpsi, the layers of stiff polyester or copolyester having an average nominal thickness greater than about 1 μm, and (b) at least two other layers are a ductile polymeric material that has been oriented in at least one direction, has a tensile modulus less than 200 kpsi, and has a tensile elongation greater than 50%.

2. A security control laminate according to claim 1 further comprising means for absorbing ultraviolet radiation, the means being either on or incorporated into a layer of the security control laminate.

3. A security control laminate according to claim 2 wherein the means for absorbing ultraviolet radiation is a coating layer interposed between the first tear resistant film and the first layer of adhesive.

4. A security control laminate according to claim 1 further comprising a dyed film, a surface of which is adhesively bonded to the second face of the first tear resistant film.

5. A security control laminate according to claim 4 further comprising an abrasion resistant coating on a surface of the dyed film opposite the surface which is adhesively bonded to the tear resistant film.

6. A security control laminate according to claim 1 further comprising a second tear resistant film, one face of which is adhesively bonded to the second face of the first tear resistant film, the second tear resistant film comprising a total of more than five stiff and ductile layers situated one on the other in a parallel array, the layers occurring essentially randomly in the array, wherein (a) at least two of the layers are a stiff polyester or copolyester that has a tensile modulus greater than 200 kpsi and (b) at least two other layers are a ductile polymeric material that has been oriented in at least one direction, has a tensile modulus less than 200 kpsi, and has a tensile elongation greater than 50%.

7. A security control laminate according to claim 6 further comprising a metallized layer on either the first or the second tear resistant film.

8. A security control laminate according to claim 7 wherein the metallized layer is secured to a face of the second tear resistant film opposite the face which is bonded to the first tear resistant film.

9. A security control laminate according to claim 7 wherein the metallized layer comprises an optically clear film having a layer of metal selected from the group consisting of aluminum, gold, silver, nickel and copper thereon.

10. A security control laminate according to claim 7 further comprising an abrasion resistant coating over the metallized layer.

11. A security control laminate according to claim 1 wherein the layers of stiff polyester or copolyester and the layers of ductile polymeric material have been biaxially oriented.

12. A security control laminate according to claim 1 wherein the first tear resistant film has a Graves area in one direction of the film equal to at least $40+0.4(x)$ kpsi %, wherein x is the nominal thickness of the first tear resistant film in microns.

13. A security control laminate according to claim 12 wherein the first tear resistant film has a tensile modulus of at least 175 kpsi in one direction of the film.

14. A security control laminate according to claim 13 wherein the first tear resistant film has a tensile modulus of at least 450 kpsi in one direction of the film.

15. A security control laminate according to claim 12 wherein the first tear resistant film has a Graves elongation at break of at least 20% in the tear direction of the film measured during the determination of Graves area.

16. A security control laminate according to claim 15 wherein the first tear resistant film has a Graves elongation at break of at least 40% in the tear direction of the film measured during the determination of Graves area.

17. A security control laminate according to claim 1 wherein the stiff polyester or copolyester comprises the reaction production of (a) a dicarboxylic acid component selected from the group consisting of terephthalic acid, naphthalene dicarboxylic acid and ester derivatives thereof, and (b) a diol component selected from the group consisting of ethylene glycol and 1,4-butanediol.

18. A security control laminate according to claim 1 wherein the ductile polymeric material is selected from the group consisting of ethylene copolymers, polyesters, copolyesters, polyolefins, polyamides, and polyurethanes.

19. A security control laminate according to claim 18 wherein the ductile polymeric material is a copolyester comprising the reaction product of cyclohexane dicarboxylic acid (or ester derivatives thereof), cyclohexane dimethanol and polytetramethylene glycol.

20. A security control laminate according to claim 1 wherein the ductile polymeric material provides at most about 20 weight percent of the first tear resistant film.

21. A security control laminate according to claim 1 further comprising a layer of an intermediate material disposed between otherwise adjacent layers of stiff polyester or copolyester and ductile polymeric material wherein the layer of intermediate material enhances the adhesion between the otherwise adjacent layers of stiff polyester or copolyester and ductile polymeric material.

22. A security control laminate comprising a first tear resistant film having a first face and a second face opposite the first face and a first layer of adhesive on the first face of the tear resistant film for bonding the security control laminate to a surface, the first tear resistant film comprising a total of more than five stiff and ductile layers situated one on the other in a parallel array, the layers occurring essentially randomly in the array, wherein (a) at least two of the layers are a stiff polyester or copolyester that has a tensile modulus greater than 200 kpsi, the layers of stiff polyester or copolyester having an average nominal thickness of about 1 to 15 μm, and (b) at least two other layers are a ductile polymeric material that has a tensile modulus less than 200 kpsi and a tensile elongation greater than 50%, wherein the ductile polymeric material is selected from the group consisting of ethylene copolymers, polyesters, copolyesters, polyolefins, and polyamides.

23. A security control laminate according to claim 22 further comprising means for absorbing ultraviolet radiation, the means being either on or incorporated into a layer of the security control laminate.

24. A security control laminate according to claim 22 further comprising a dyed film, a surface of which is adhesively bonded to the second face of the first tear resistant film.

25. A security control laminate according to claim 24 further comprising an abrasion resistant coating on a surface of the dyed film opposite the surface which is adhesively bonded to the first tear resistant film.

26. A security control laminate according to claim 22 further comprising a second tear resistant film one face of which is adhesively bonded to the second face of the first tear resistant film, the second tear resistant film comprising a total of more than five stiff and ductile layers situated one on the other in a parallel array, the layers occurring essentially randomly in the array, wherein (a) at least two of the layers are a stiff polyester or copolyester that has a tensile modulus greater than 200 kpsi and (b) at least two other layers are a ductile polymeric material that has a tensile modulus less than 200 kpsi and a tensile elongation greater than 50%.

27. A security control laminate according to claim 26 further comprising a metallized layer on the face of the second tear resistant film opposite the face which is bonded to the first tear resistant film.

28. A security control laminate according to claim 27 further comprising an abrasion resistant coating over the metallized layer.

29. A security control laminate according to claim 22 wherein the first tear resistant film has a Graves area in one direction of the film equal to at least about $40+0.4(x)$ kpsi %, wherein x is the nominal thickness of the first tear resistant film in microns.

30. A security control laminate according to claim 29 wherein the first tear resistant film has a tensile modulus of at least 175 kpsi in one direction of the film.

31. A security control laminate according to claim 30 wherein the first tear resistant film has a tensile modulus of at least 450 kpsi in one-direction of the film.

32. A security control laminate according to claim 29 wherein the first tear resistant film has a Graves elongation at break of at least 20% in the tear direction of the film measured during the determination of Graves area.

33. A security control laminate according to claim 32 wherein the first tear resistant film has a Graves elongation at break of at least 40% in the tear direction of the film measured during the determination of Graves area.

34. A security control laminate comprising a tear resistant film having a first face and a second face opposite the first face and a first layer of adhesive on the first face of the tear resistant film for bonding the security control laminate to a surface, the tear resistant film comprising a total of more than five stiff and ductile layers situated one on the other in a parallel array, the layers occurring essentially randomly in the array, wherein (a) at least two of the layers are a stiff polyester or copolyester that has a tensile modulus greater than 200 kpsi, the layers of stiff polyester or copolyester having an average nominal thickness of about 1 to 15 μm, and (b) at least two other layers are a ductile polymeric material that has a tensile modulus less than 200 kpsi and a tensile elongation greater than 50%, the layers of ductile polymeric material having an average nominal thickness of less than 3 μm.

35. A security control laminate according to claim 34 wherein the tear resistant film has a Graves area in one direction of the film equal to at least about $40+0.4(x)$ kpsi %, wherein x is the nominal thickness of the first tear resistant film in microns.

36. A security control laminate according to claim 35 wherein the tear resistant film has a tensile modulus of at least 175 kpsi in one direction of the film.

37. A security control laminate according to claim 36 wherein the tear resistant film has a tensile modulus of at least 450 kpsi in one direction of the film.

38. A security control laminate according to claim 34 wherein the tear resistant film has a Graves elongation at break of at least 20% in the tear direction of the film measured during the determination of Graves area.

39. A security control laminate according to claim 38 wherein the tear resistant film has a Graves elongation at break of at least 40% in the tear direction of the film measured during the determination of Graves area.

40. A security control laminate according to claim 34 further comprising means for absorbing ultraviolet radiation, the means being either on or incorporated into a layer of the security control laminate.

41. A security control laminate according to claim 40 further comprising a dyed film, a surface of which is adhesively bonded to the second face of the tear resistant film.

42. A security control laminate according to claim 41 further comprising an abrasion resistant coating on a surface of the dyed film opposite the surface which is adhesively bonded to the tear resistant film.

43. A security control laminate comprising:
(A) a tear resistant film having a first face and a second face opposite the first face;
(B) a first layer of adhesive on the first face of the tear resistant film for bonding the security control laminate to a surface; and
(C) means for absorbing ultraviolet radiation, the means being either on or incorporated into a layer of the security control laminate;

wherein the tear resistant film comprises a total of about thirteen alternating stiff and ductile layers situated one on the other in a parallel array, and further wherein:
(a) about seven of the layers are a stiff polyester or copolyester that has a tensile modulus greater than 200 kpsi and that comprises the reaction product of (i) a dicarboxylic acid component selected from the group consisting of terephthalic acid, naphthalene dicarboxylic acid, and ester derivatives thereof, and (ii) a diol component selected from the group consisting of ethylene glycol and 1,4-butanediol, the layers of stiff polyester or copolyester having an average nominal thickness greater than about 1 μm;
(b) about six other layers are a ductile polymeric material that has a tensile modulus less than 200 kpsi and a tensile elongation greater than 50%;
(c) the tear resistant film has a Graves area in one direction of the film equal to at least about $40+0.4(x)$ kpsi %, wherein x is the nominal thickness of the tear resistant film in microns;
(d) the tear resistant film has a Graves elongation at break of at least 20% in the tear direction of the film measured during the determination of Graves area; and
(e) the tear resistant film has a tensile modulus of at least 175 kpsi in one direction of the film.

* * * * *